(12) United States Patent
Yamazaki

(10) Patent No.: US 10,328,633 B2
(45) Date of Patent: Jun. 25, 2019

(54) SOLID OBJECT SHAPING APPARATUS, CONTROL METHOD FOR SOLID OBJECT SHAPING APPARATUS, AND CONTROL PROGRAM FOR SOLID OBJECT SHAPING APPARATUS

(71) Applicant: Seiko Epson Corporation, Tokyo (JP)

(72) Inventor: Satoshi Yamazaki, Matsumoto (JP)

(73) Assignee: Seiko Epson Corporation (JP)

( * ) Notice: Subject to any disclaimer, the term of this patent is extended or adjusted under 35 U.S.C. 154(b) by 114 days.

(21) Appl. No.: 15/548,560

(22) PCT Filed: Jan. 19, 2016

(86) PCT No.: PCT/JP2016/000237
§ 371 (c)(1),
(2) Date: Aug. 3, 2017

(87) PCT Pub. No.: WO2016/132672
PCT Pub. Date: Aug. 25, 2016

(65) Prior Publication Data
US 2018/0001546 A1    Jan. 4, 2018

(30) Foreign Application Priority Data
Feb. 19, 2015    (JP) .................................. 2015-030154

(51) Int. Cl.
*B29C 64/112*    (2017.01)
*B33Y 30/00*    (2015.01)
(Continued)

(52) U.S. Cl.
CPC .......... *B29C 64/112* (2017.08); *B29C 64/209* (2017.08); *B29C 64/264* (2017.08);
(Continued)

(58) Field of Classification Search
CPC ... B29C 64/112; B29C 64/393; B29C 64/209; B29C 64/264; B33Y 30/00; B33Y 10/00;
(Continued)

(56) References Cited

U.S. PATENT DOCUMENTS

| 8,059,120 B2 * | 11/2011 | Hashima ................. G06T 19/00 |
| | | 345/419 |
| 10,005,303 B2 * | 6/2018 | Giacobbi ............... B41J 29/393 |
| 2002/0167101 A1 | 11/2002 | Tochimoto et al. |

FOREIGN PATENT DOCUMENTS

| JP | 2000-280354 A | 10/2000 |
| JP | 2002-264221 A | 9/2002 |
| JP | 2013-043338 A | 3/2013 |

* cited by examiner

*Primary Examiner* — Nahida Sultana
(74) *Attorney, Agent, or Firm* — Harness, Dickey & Pierce, P.L.C.

(57) ABSTRACT

A solid object shaping apparatus can shape a solid object having a designated color, and includes a head unit that can eject a plurality of types of liquids including a first liquid used to represent the designated color and a curing unit that cures the plurality of liquids so as to form a plurality of blocks including a first block. The blocks include a first surface block whose upper face or lower face corresponds to a surface of the solid object and a second surface block whose side face corresponds to the surface of the solid object. When the solid object is shaped, the number of the first blocks used in a predetermined area formed by an upper face of the first surface block is different from the number of the first blocks used in a predetermined area formed by a side face of the second surface block.

8 Claims, 19 Drawing Sheets

(51) Int. Cl.
*B33Y 50/02* (2015.01)
*B33Y 10/00* (2015.01)
*B29C 64/264* (2017.01)
*B29C 64/209* (2017.01)
*B29C 64/393* (2017.01)
*B29K 105/00* (2006.01)

(52) U.S. Cl.
CPC ............ *B29C 64/393* (2017.08); *B33Y 10/00* (2014.12); *B33Y 30/00* (2014.12); *B33Y 50/02* (2014.12); *B29K 2105/0058* (2013.01); *B29K 2995/002* (2013.01)

(58) Field of Classification Search
CPC .............. B33Y 50/02; B29K 2995/002; B29K 2105/0058
See application file for complete search history.

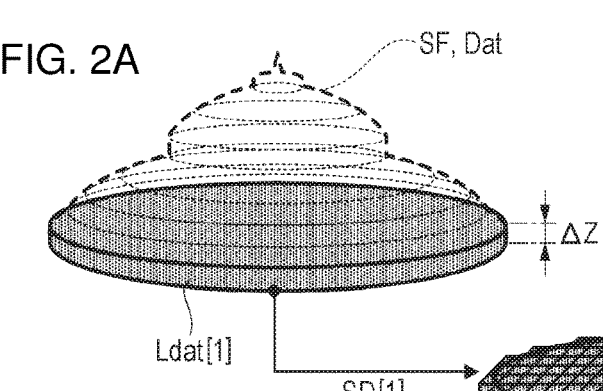
FIG. 2A
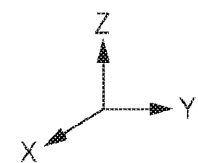
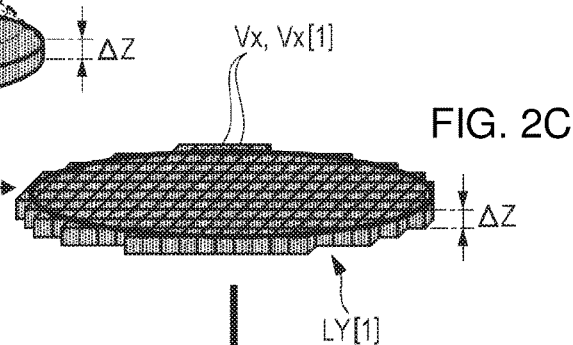
FIG. 2C
FIG. 2B
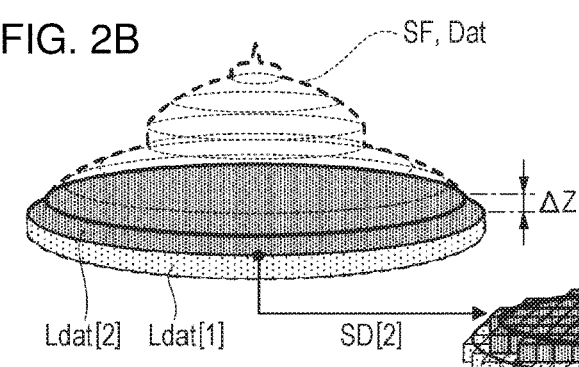
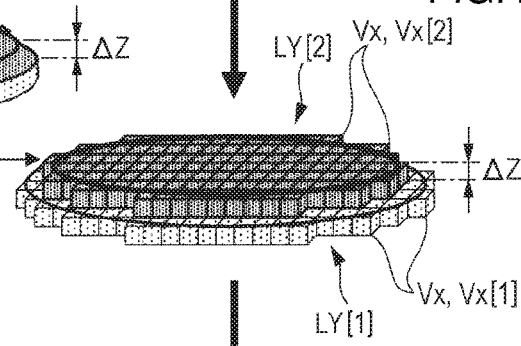
FIG. 2D
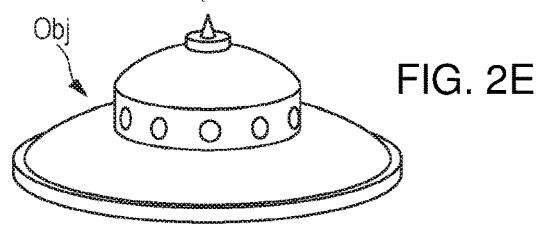
FIG. 2E

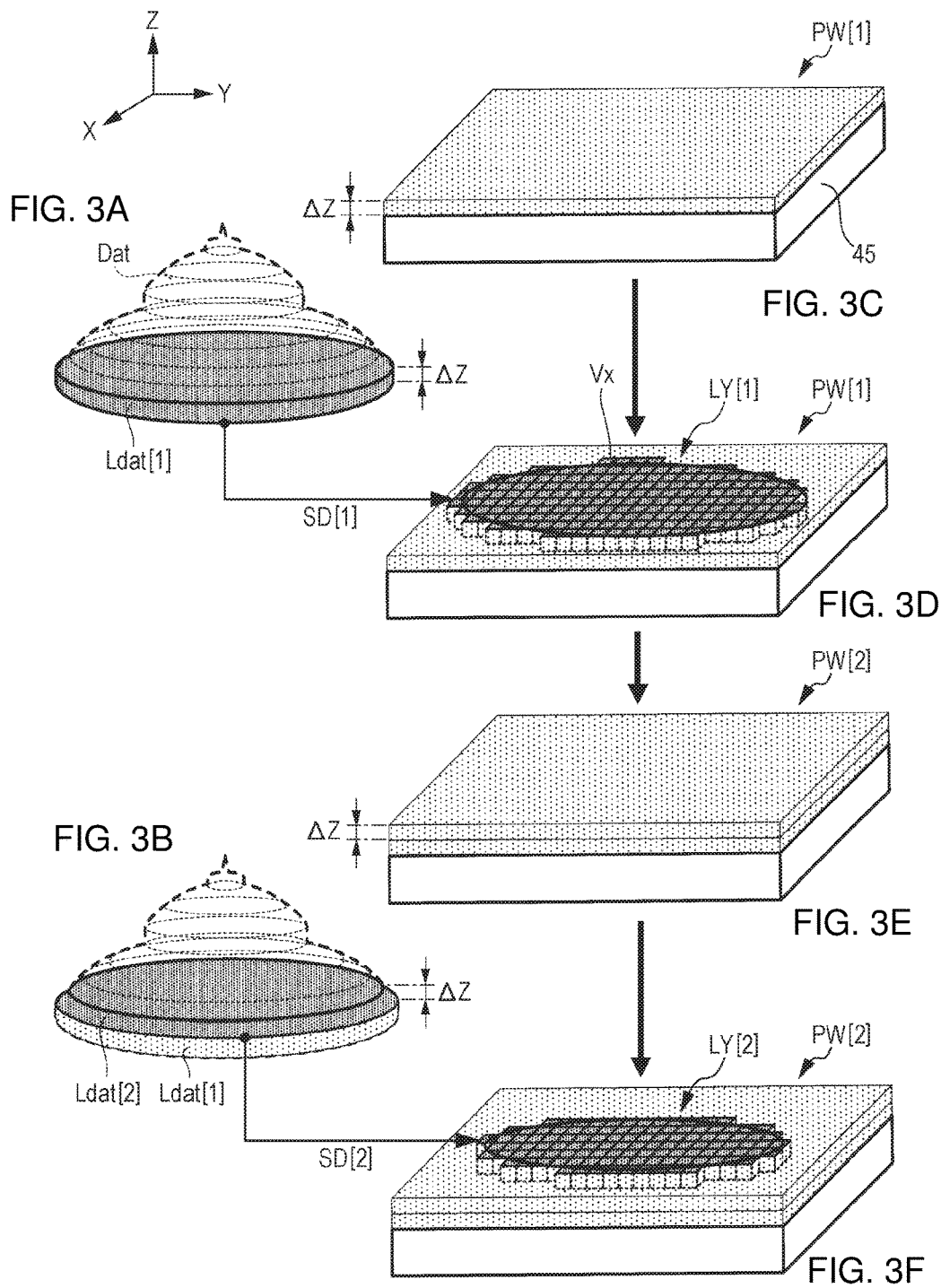

| DOT SIZE | SI[m] (b1, b2) | Sel[m] | |
|---|---|---|---|
| | | Ts1 | Ts2 |
| LARGE DOT | (1, 1) | H | H |
| SMALL DOT | (1, 0) | H | L |
| NON-RECORDING | (0, 0) | L | L |

SOLID OBJECT

SECTION OF SOLID OBJECT

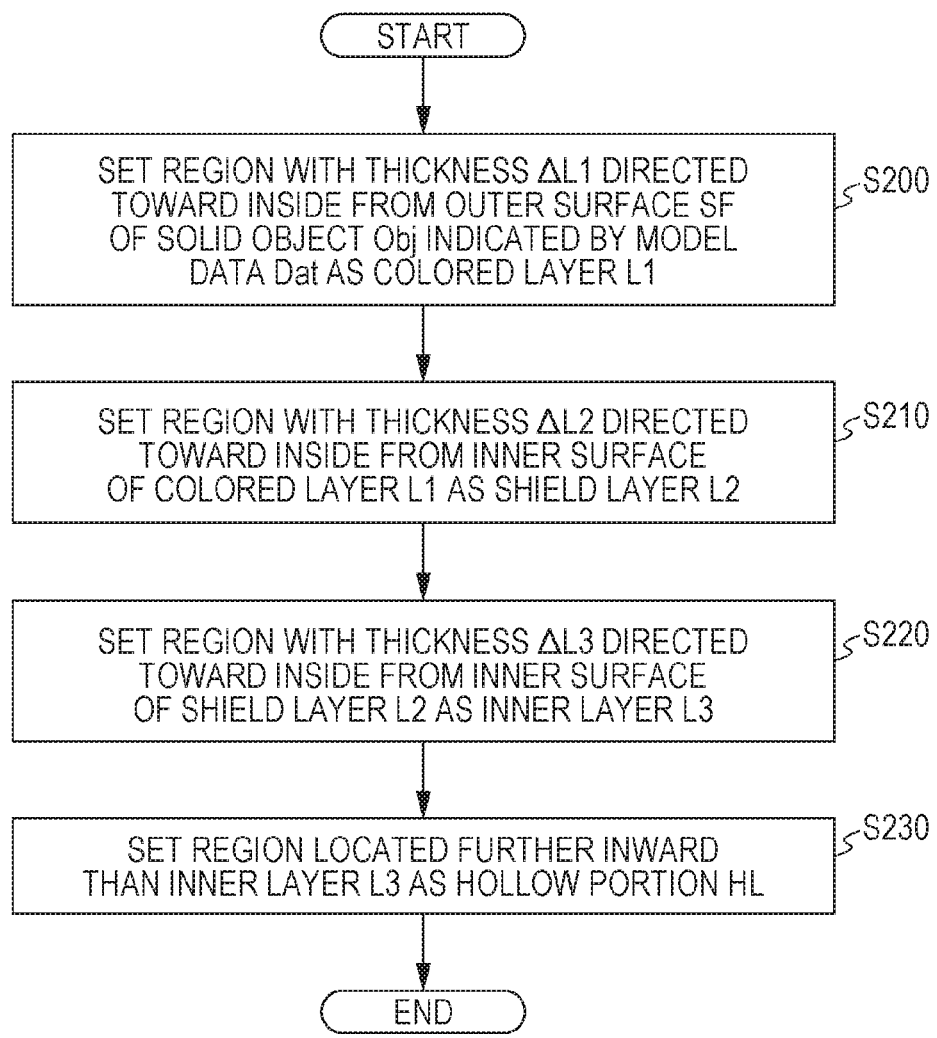

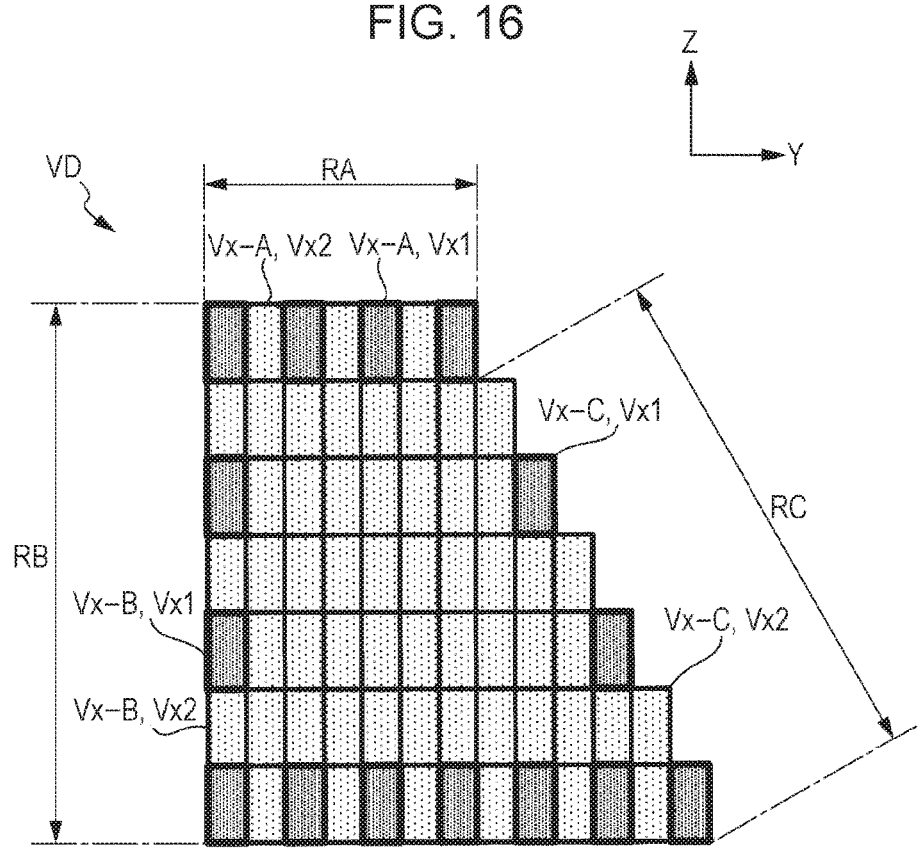

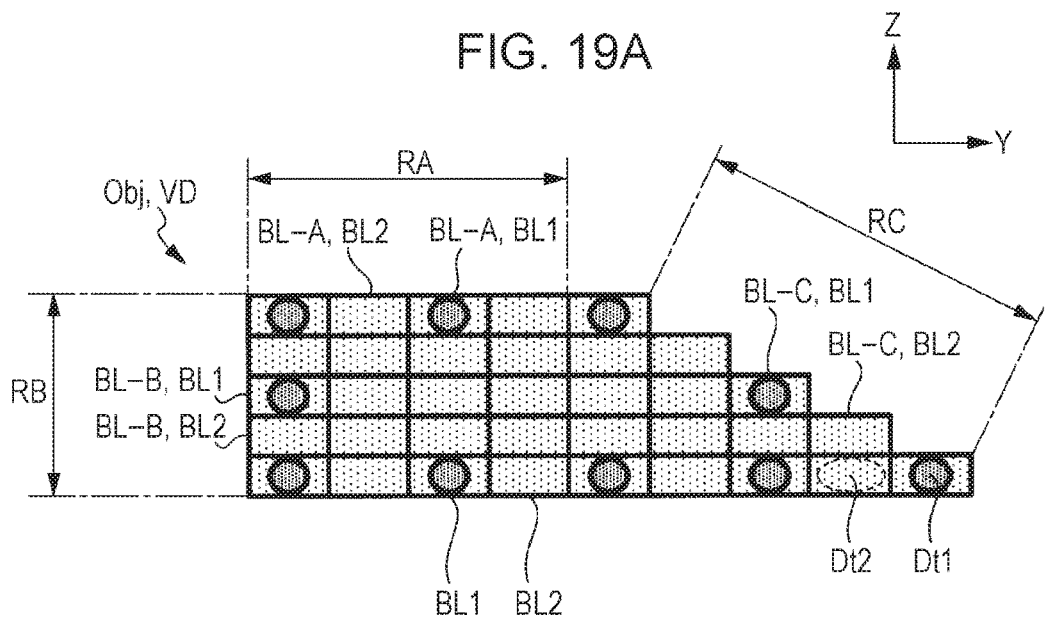
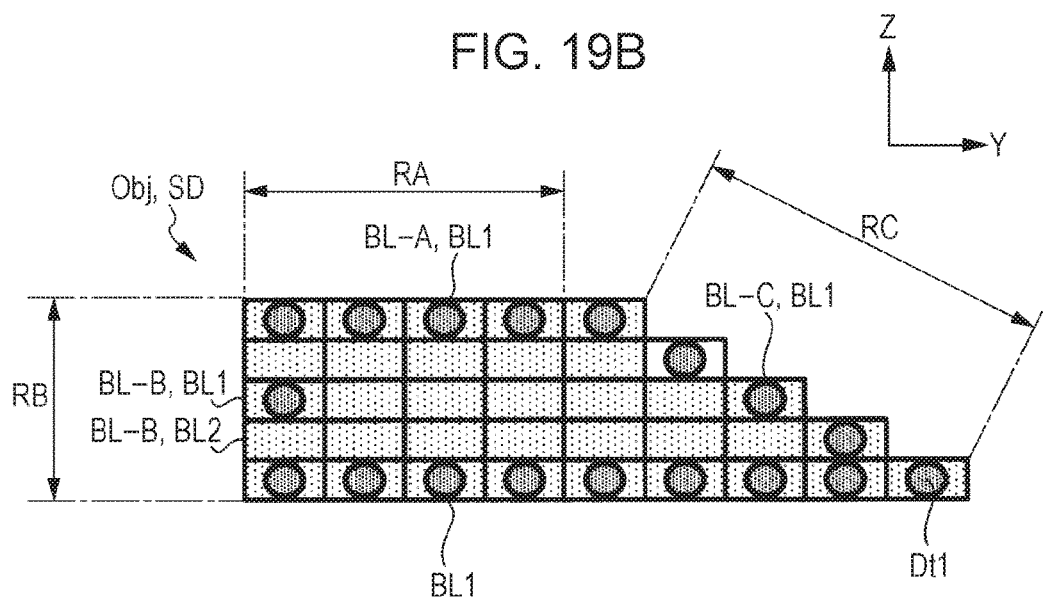

SOLID OBJECT SHAPING APPARATUS, CONTROL METHOD FOR SOLID OBJECT SHAPING APPARATUS, AND CONTROL PROGRAM FOR SOLID OBJECT SHAPING APPARATUS

BACKGROUND

Technical Field

The present invention relates to a solid object shaping apparatus, a control method for the solid object shaping apparatus, and a control program for the solid object shaping apparatus.

Background Art

In recent years, various solid object shaping apparatuses such as 3D printers have been proposed. The solid object shaping apparatus forms a block in a voxel which is a virtual rectangular parallelepiped by using dots which are formed through ejection of a liquid such as ink, and shapes a solid object by using a plurality of blocks. In such a solid object shaping apparatus, various techniques have been proposed in which a plurality of inks having a plurality of colors are ejected in order to form dots having a plurality of colors, and thus a colored solid object is shaped (for example, JP-A-2002-264221).

Meanwhile, in a case where a block is formed in a voxel by using one or a plurality of dots, a shape of the voxel may be different from a shape of the dot. For this reason, for example, even if blocks including dots having a color for coloring a solid object are disposed in a uniform density in order to shape the solid object having a uniform color, a dot distribution density may be nonuniform. In this case, shades occur in a color of the solid object depending on a viewing angle direction, and thus the solid object having a nonuniform color is shaped. For example, even if a solid object which does not have a uniform color is shaped, color unevenness or deterioration in color reproducibility occurs due to a difference between shapes of the block and the dot, and thus a color to be originally displayed cannot be accurately reproduced.

An advantage of some aspects of the invention is to provide a technique of reproducing an accurate color of a solid object when a solid object shaping apparatus shapes the solid object.

SUMMARY

According to an aspect of the invention, there is provided a solid object shaping apparatus including a head unit that can eject a plurality of types of liquids including a first liquid containing a first colorant component used to represent a designated color which is designated by a model for representing a shape and a color of a solid object, and a second liquid having a color which is different from the first liquid; and a curing unit that cures the first liquid ejected from the head unit so as to form a first dot, and cures the second liquid ejected from the head unit so as to form a second dot, in which a first color block is formed by using the first dot, a second color block is formed by using the second dot without using the first dot, and the solid object is shaped by using a plurality of blocks including the first color block and the second color block, in which a plurality of blocks constituting the solid object include a first surface block whose upper face or lower face corresponds to a surface of the solid object when the solid object is shaped, and a second surface block whose one side face corresponds to the surface of the solid object when the solid object is shaped, and in which the number of the first color blocks forming a first region in a case where the model designates the designated color for the first region formed of a predetermined number of the first surface blocks is different from the number of the first color blocks forming a second region in a case where the model designates the designated color for the second region formed of a predetermined number of the second surface blocks.

Generally, a shape of a voxel which is a virtual rectangular parallelepiped for disposing a block is different from a shape of a dot. For this reason, in a case where the first color blocks including the first dot for representing a designated color are disposed in the first region and the second region with the same density, there is a high possibility that a color reproduced in the first region and a color reproduced in the second region may be different colors or colors with different densities.

According to the aspect of the invention, the first color blocks are prevented from being disposed in the first region and the second region with the same density. Thus, when compared with a case where the first color blocks are disposed in the first region and the second region with the same density, it is possible to minimize the possibility that colors may be nonuniform between the first region and the second region. Consequently, it is possible to reproduce an accurate color in a solid object.

As the first liquid, for example, chromatic ink or achromatic ink may be used. As the second liquid, a liquid having a color which is different from a color of the first liquid may be used, for example, chromatic ink, achromatic ink, or clear ink may be used.

In the aspect of the invention, an upper face of a block during shaping of a solid object corresponds to a laminate direction in a case where the solid object shaping apparatus forms a shaping layer by using a plurality of block, and shapes the solid object by sequentially laminating a plurality of shaping layers.

Each of the dots (the first dot and the second dot) may be formed by using only a liquid ejected from the head unit, and may include an object other than the liquid, for example, powders which are provided in advance at a position where the liquid is ejected, in addition to the liquid. The powders may be ones which are hardened by curing the liquid.

In the solid object shaping apparatus, preferably, the plurality of blocks constituting the solid object further include a third surface block whose upper face or lower face and at least one of side faces correspond to the surface of the solid object, and the number of the first color blocks forming a third region in a case where the model designates the designated color for the third region formed of a predetermined number of the third surface blocks is different from the number of the first color blocks forming a first region in a case where the model designates the designated color for the first region.

Generally, a shape of a voxel which is a virtual rectangular parallelepiped for disposing a block is different from a shape of a dot. For this reason, in a case where the first color blocks are disposed in the first region and the third region with the same density, there is a high possibility that a color reproduced in the first region and a color reproduced in the third region may be different colors or colors with different densities.

According to the aspect of the invention, the first color blocks are prevented from being disposed in the first region and the third region with the same density. Thus, it is possible to minimize the possibility that colors may be nonuniform between the first region and the third region.

In the solid object shaping apparatus, preferably, a proportion of an area occupied by one or a plurality of first dots included in the first region for the first region in a case where the model designates the designated color to a total area of the first region is substantially the same as a proportion of an area occupied by one or a plurality of first dots included in the second region to a total area of the second region in a case where the model designates the designated color for the second region.

According to the aspect, the first color blocks are disposed so that densities of the first dots for representing the designated color are substantially the same as each other in the first region and the second region. For this reason, it is possible to make colors uniform between the first region and the second region and thus to reproduce an accurate color in a solid object.

In the solid object shaping apparatus, preferably, a proportion of an area occupied by one or a plurality of first dots included in the first region for the first region in a case where the model designates the designated color to a total area of the first region is substantially the same as a proportion of an area occupied by one or a plurality of first dots included in the third region to a total area of the third region in a case where the model designates the designated color for the third region.

According to the aspect, the first color blocks are disposed so that densities of the first dots for representing the designated color are substantially the same as each other in the first region and the third region. For this reason, it is possible to make colors uniform between the first region and the third region and thus to reproduce an accurate color in a solid object.

In the solid object shaping apparatus, the amount of colorant components contained in the second liquid is preferably smaller than the amount of colorant components contained the first liquid.

According to the aspect, the ratio between the first dot formed by curing the first liquid and the second dot formed by curing the second liquid in a surface of a solid object is adjusted, and thus it is possible to control the density of a color reproduced in the solid object. For this reason, it is possible to accurately reproduce a designated color in the solid object.

As the second liquid, a transparent liquid which does not contain a colorant component, or a substantially transparent liquid which contains a small amount of colorant components to the extent of being regarded as not containing a colorant component, may be used. For example, clear ink may be used as the second liquid.

In the solid object shaping apparatus, the second liquid preferably contains a second colorant component used to represent the designated color.

According to the aspect, a ratio between the first dot formed by curing the first liquid and the second dot formed by curing the second liquid in a surface of a solid object is adjusted, and thus it is possible to control the density of a color reproduced in the solid object. For this reason, it is possible to accurately reproduce a designated color in the solid object.

As the second liquid, a liquid containing a chromatic colorant component, or an achromatic colorant component such as a white colorant component may be used.

According to another aspect of the invention, there is provided a control method for a solid object shaping apparatus which includes a head unit that can eject a plurality of types of liquids including a first liquid containing a first colorant component used to represent a designated color which is designated by a model for representing a shape and a color of a solid object, and a second liquid having a color which is different from the first liquid; and a curing unit that cures the first liquid ejected from the head unit so as to form a first dot, and cures the second liquid ejected from the head unit so as to form a second dot, and which forms a first color block by using the first dot, forms a second color block by using the second dot without using the first dot, and shapes the solid object by using a plurality of blocks including the first color block and the second color block, the method including controlling the head unit and the curing unit in order to shape the solid object, in which a plurality of blocks constituting the solid object include a first surface block whose upper face or lower face corresponds to a surface of the solid object when the solid object is shaped, and a second surface block whose one side face corresponds to the surface of the solid object when the solid object is shaped, and in which the number of the first color blocks forming a first region in a case where the model designates the designated color for the first region formed of a predetermined number of the first surface blocks is different from the number of the first color blocks forming a second region in a case where the model designates the designated color for the second region formed of a predetermined number of the second surface blocks.

According to the aspect of the invention, the first color blocks are prevented from being disposed in the first region and the second region with the same density. Thus, it is possible to minimize the possibility that colors may be nonuniform between the first region and the second region.

According to still another aspect of the invention, there is provided a control program for a solid object shaping apparatus which includes a head unit that can eject a first liquid containing a first colorant component used to represent a designated color which is designated by a model for representing a shape and a color of a solid object, and a second liquid having a color which is different from the first liquid; a curing unit that cures the first liquid ejected from the head unit so as to form a first dot, and cures the second liquid ejected from the head unit so as to form a second dot; and a computer, and which forms a first color block by using the first dot, forms a second color block by using the second dot without using the first dot, and shapes the solid object by using a plurality of blocks including the first color block and the second color block, the program causing the computer to function as a control portion that controls the head unit and the curing unit in order to shape the solid object, in which a plurality of blocks constituting the solid object include a first surface block whose upper face or lower face corresponds to a surface of the solid object when the solid object is shaped, and a second surface block whose one side face corresponds to the surface of the solid object when the solid object is shaped, and in which the number of the first color blocks forming a first region in a case where the model designates the designated color for the first region formed of a predetermined number of the first surface blocks is different from the number of the first color blocks forming a second region in a case where the model designates the designated color for the second region formed of a predetermined number of the second surface blocks.

According to the aspect of the invention, the first color blocks are prevented from being disposed in the first region and the second region with the same density. Thus, it is possible to minimize the possibility that colors may be nonuniform between the first region and the second region.

BRIEF DESCRIPTION OF DRAWINGS

FIGS. 2A-2E are diagrams for explaining shaping of a solid object Obj in the solid object shaping system 100.

FIGS. 3A-3F are diagrams for explaining shaping of a solid object Obj in the solid object shaping system 100.

FIG. 13 is a flowchart illustrating a shape complementing process.

FIG. 16 is a diagram for explaining a voxel assembly indicated by voxel data VD.

FIG. 19A is a diagram for explaining arrangement of blocks BL in a solid object Obj according to Modification Example 2.

FIG. 19B is a diagram for explaining arrangement of blocks BL in a solid object Obj according to Modification Example 2.

DETAILED DESCRIPTION

Hereinafter, an embodiment of the invention will be described with reference to the drawings. However, a dimension and a scale of each part are different from actual ones as appropriate in each drawing. The embodiment described below is a preferred specific example of the invention and is thus added with technically preferred various limitations, but the scope of the invention is not limited to such an embodiment unless description for limiting the invention is made in the following description.

A. Embodiment

In the present embodiment, as a solid object shaping apparatus, a description will be made by exemplifying an ink jet type solid object shaping apparatus which ejects curable ink (an example of a "liquid") such as resin ink containing resin emulsion or ultraviolet curable ink so as to shape a solid object Obj.

1. Configuration of Solid Object Shaping System

Hereinafter, with reference to FIGS. 1 to 10, a description will be made of a solid object shaping system 100 including a solid object shaping apparatus 1 according to the present embodiment.

Figure 1:
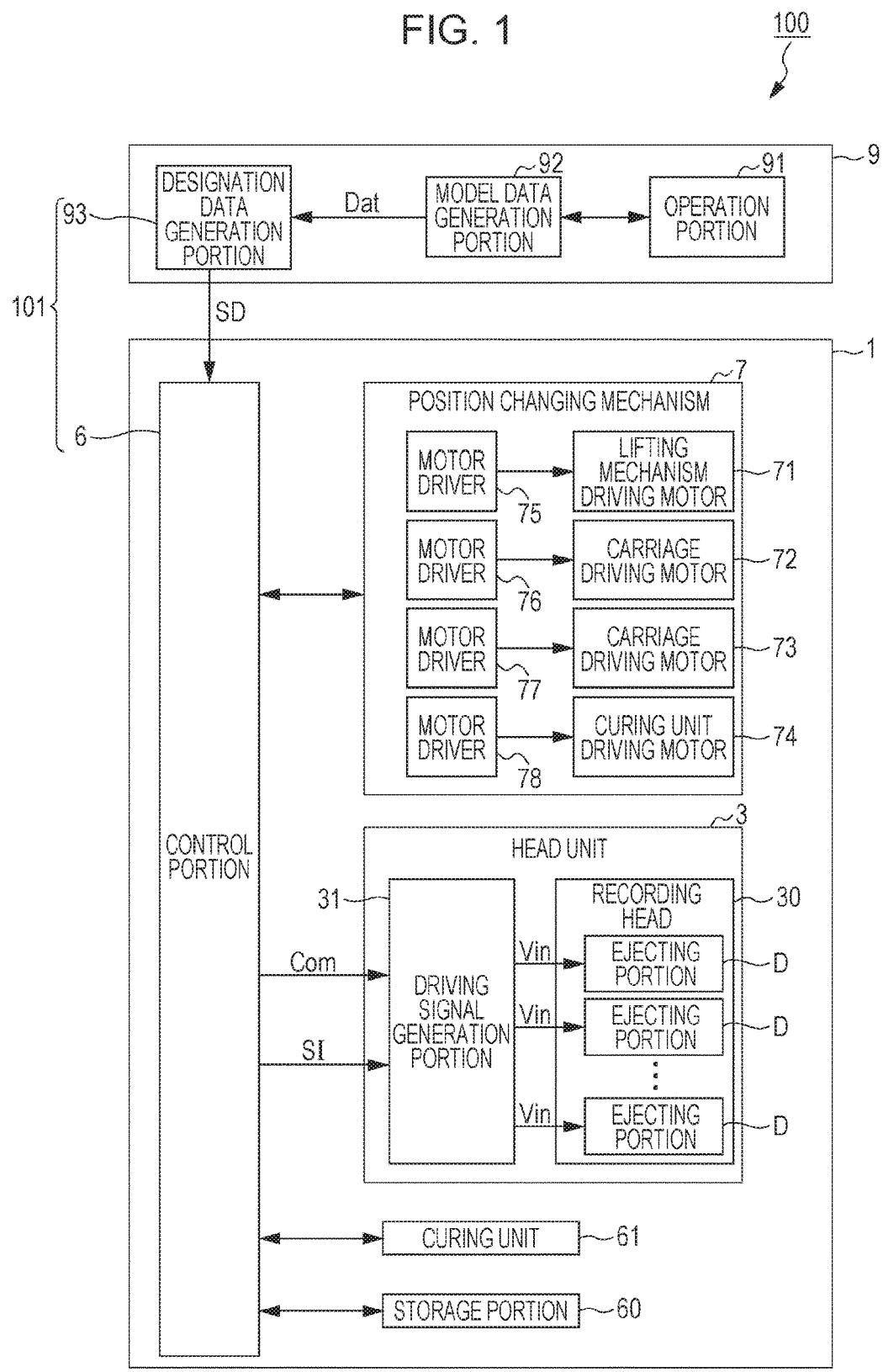
FIG. 1 is a block diagram illustrating a configuration of a solid object shaping system 100 according to an embodiment of the invention.

FIG. 1 is a functional block diagram illustrating a configuration of the solid object shaping system 100.

As illustrated in FIG. 1, the solid object shaping system 100 includes the solid object shaping apparatus 1 and a host computer 9. The solid object shaping apparatus 1 performs a shaping process of ejecting ink, forming a layer-like shaping body LY (an example of a "shaping layer") with a predetermined thickness $\Delta Z$ by using dots formed by the ejected ink, and shaping a solid object Obj by laminating the shaping body LY. The host computer 9 performs a data generation process of generating designation data SD designating a shape and a color of each of a plurality of shaping bodies LY constituting the solid object Obj shaped by the solid object shaping apparatus 1.

1.1 Host Computer

As illustrated in FIG. 1, the host computer 9 includes a CPU (not illustrated) which controls operations of respective portions of the host computer 9; a display portion (not illustrated) such as a display; an operation portion 91 such as a keyboard or a mouse; an information storage portion (not illustrated) which stores a control program for the host computer 9, a driver program for the solid object shaping apparatus 1, and application programs such as computer aided design (CAD) software; a model data generation portion 92 which generates model data Dat; and a designation data generation portion 93 which generates the data generation process of generating the designation data SD on the basis of the model data Dat.

Here, the model data Dat is data indicating a shape and a color of a model which represents the solid object Obj which is to be shaped by the solid object shaping apparatus 1, and designates a shape and a color of the solid object Obj. In the following description, it is assumed that a color of the solid object Obj includes a method of giving a plurality of colors in a case where the plurality of colors are given to the solid object Obj, that is, shapes, characters, and other images represented by the plurality of colors given to the solid object Obj.

The model data generation portion 92 is a functional block which is realized by the CPU of the host computer 9 executing the application programs stored in the information storage portion. The model data generation portion 92 is, for example, a CAD application, and generates the model data Dat indicating a model for representing a shape and a color of the solid object Obj on the basis of information or the like which is input by a user of the solid object shaping system 100 operating the operation portion 91.

In the present embodiment, it is assumed that the model data Dat designates an outer shape of the solid object Obj. In other words, it is assumed that the model data Dat designates a shape of a hollow object when the solid object Obj is assumed to be the hollow object, that is, a shape of an outer surface SF which is a contour of a model of the solid object Obj. For example, in a case where the solid object Obj is a sphere, the model data Dat designates a shape of a spherical surface which is a contour of the sphere.

However, the invention is not limited to such an aspect, and the model data Dat may include at least information which can specify a shape of an outer surface SF of a model of the solid object Obj.

For example, the model data Dat may be data for designating a more inner shape than the outer surface SF of the model of the solid object Obj or a material of the solid object Obj in addition to a shape of the outer surface SF of the model of the solid object Obj and a color of the solid object Obj.

The model data Dat may have a data format such as Additive Manufacturing File Format (AMF) or Standard Triangulated Language (STL).

The designation data generation portion 93 is a functional block which is realized by the CPU of the host computer 9 executing the driver program for the solid object shaping apparatus 1 stored in the information storage portion. The designation data generation portion 93 performs the data generation process of generating the designation data SD for designating a shape and a color of the shaping body LY formed by the solid object shaping apparatus 1 on the basis of the model data Dat generated by the model data generation portion 92.

In the following description, it is assumed that the solid object Obj is shaped by laminating Q layer-like shaping bodies LY (where Q is a natural number which is equal to or greater than 2). A process in which the solid object shaping apparatus 1 forms the shaping body LY is referred to as a laminate process. In other words, the shaping process in which the solid object shaping apparatus 1 shapes the solid object Obj includes Q laminate processes. Hereinafter, the shaping body LY formed in the q-th laminate process among the Q laminate processes included in the shaping process is referred to as a shaping body LY[q], and the designation data SD for designating a shape and a color of the shaping body LY[q] is referred to as designation data SD[q] (where q is a natural number which is equal to or greater than 1 and is equal to or smaller than Q).

FIGS. 2A-2E are diagrams for explaining a relationship between the shape of an outer surface SF of a model of the solid object Obj designated by the model data Dat, and the shaping body LY formed by using the designation data SD.

As illustrated in FIGS. 2A and 2B, in order to generate designation data SD[1] to SD[Q] designating shapes and colors of shaping bodies LY[1] to LY[Q] each having a predetermined thickness $\Delta Z$, the designation data generation portion 93 first slices the outer surface SF of the model having a three-dimensional shape indicated by the model data Dat for each predetermined thickness $\Delta Z$ so as to generate sectional model data Ldat[1] to Ldat[Q] corresponding to the shaping bodies LY[1] to LY[Q] with a one-to-one relationship. Here, the section model data Ldat is data indicating a shape and a color of a sectional body obtained by slicing the model having a three-dimensional shape indicated by the model data Dat. However, the section model data Ldat may include data indicating a shape and a color of a section obtained by slicing the model having a three-dimensional shape indicated by the model data Dat. FIG. 2A exemplifies the section model data Ldat[1] corresponding to the shaping body LY[1] formed in the first laminate process, and FIG. 2B exemplifies the section model data Ldat[2] corresponding to the shaping body LY[2] formed in the second laminate process.

Next, the designation data generation portion 93 determines the arrangement of dots to be formed by the solid object shaping apparatus 1 in order to form a shaping body LY[q] corresponding to a shape and a color indicated by the section model data Ldat[q] and outputs a determination result as the designation data SD. More specifically, the designation data generation portion 93 generates voxel data VD on the basis of the section model data Ldat, and generates the designation data SD on the basis of the voxel data VD. Hereinafter, regarding the voxel data VD, the voxel data VD generated on the basis of the section model data Ldat[q] is referred to as voxel data VD[q]. In other words, the designation data generation portion 93 generates the voxel data VD[q] on the basis of the section model data Ldat[q], and generates the designation data SD[q] on the basis of the voxel data VD[q].

Here, the voxel data VD[q] is data approximating and representing, as a set of voxels Vx, the shape and the color of the sectional body of the model of the solid object Obj indicated by the section model data Ldat[q], by subdividing the shape and the color of the sectional body of the model of the solid object Obj indicated by the section model data Ldat[q] in a lattice form.

The designation data SD[q] is data designating a color and a size of a dot to be formed in each of a plurality of voxels Vx. In other words, the designation data SD is data designating a color and a size of a dot which is to be formed in order to shape the solid object Obj. For example, the designation data SD may designate a color of a dot depending on the type of ink used to form the dot. The type of ink will be described later.

The voxel Vx is a rectangular parallelepiped which has a predetermined size, a predetermined thickness $\Delta Z$, and a predetermined volume. In the present specification, the rectangular parallelepiped will be described as a concept including a cube. In the present embodiment, a volume and a size of the voxel Vx are determined in accordance with a size of a dot which can be formed by the solid object shaping apparatus 1. Hereinafter, a voxel Vx corresponding to the shaping body LY[q] is referred to as a voxel Vx[q] in some cases.

In addition, hereinafter, a constituent element of the solid object Obj partitioned by a single voxel Vx is referred to as a block BL. As will be described later in detail, the block BL is constituted of one or a plurality of dots. In other words, the block BL is a constituent element of the solid object Obj provided inside a single voxel Vx and including one or a plurality of dots. In other words, in the present embodiment, the designation data SD designates that one or a plurality of dots are to be formed in each voxel Vx.

The solid object shaping system 100 shapes the solid object Obj as a set of a plurality of blocks BL (hereinafter, referred to as, a "block assembly"). In other words, the solid object shaping system 100 subdivides a model of the solid object Obj indicated by the model data Dat in a lattice form so as to represent the model as an assembly a plurality of voxels Vx (hereinafter, referred to as a "voxel assembly"), and shapes the solid object Obj as a block assembly by forming the block BL in each of the plurality of voxels Vx constituting the voxel assembly by using dots.

As illustrated in FIGS. 2C and 2D, if the designation data SD[q] is supplied from the designation data generation portion 93, the solid object shaping apparatus 1 performs the laminate process of forming the shaping body LY[q]. FIG. 2C exemplifies a case where the first shaping body LY[1] is formed in the +Z direction (hereinafter, the +Z direction is referred to as an "upper side" or an "upper direction") of a shaping platform 45 (refer to FIG. 3) on the basis of designation data SD[1] generated from the section model data Ldat[1], and FIG. 2D a case where the second shaping body LY[2] is formed on the first shaping body LY[1] on the basis of designation data SD[2] generated from the section model data Ldat[2].

The solid object shaping apparatus 1 sequentially laminates the shaping bodies LY[1] to LY[Q] corresponding to the designation data SD[1] to SD[Q] in the upper direction, so as to shape the solid object Obj illustrated in FIG. 2E.

As illustrated in FIGS. 2A-2E, the solid object Obj may be shaped according to a method (hereinafter, referred to as a "first shaping method") in which the solid object is shaped by laminating a shaping body LY formed by a dot which is formed by curing curable ink, and a method (hereinafter, referred to as a "second shaping method") in which curable ink is ejected onto powders (hereinafter, referred to as a "powder layer PW") which are spread in a layer state with a predetermined thickness ΔZ, the powders are hardened by the curable shaping ink so as to form a shaping body LY, and the solid object Obj is shaped by laminating the formed shaping body LY (refer to FIGS. 3A-3F which will be described later).

In the present embodiment of the invention, the shaping process and the laminate process may be performed according to either the first shaping method or the second shaping method, but, hereinafter, for convenience of description, a case of using the second shaping method will be described as an example. Hereinafter, the powder layer PW which is provided in the q-th laminate process prior to formation of the shaping body LY[q] is referred to as a powder layer PW[q].

FIGS. 3A-3F are diagrams for explaining summary of the shaping process according to the second shaping method.

FIGS. 3A and 3B exemplify section model data Ldat[1] and Ldat[2] in the same manner as FIGS. 2A and 2B.

As illustrated in FIG. 3C, the solid object shaping apparatus 1 forms the powder layer PW[1] before forming the shaping body LY[1]. Next, as illustrated in FIG. 3D, the solid object shaping apparatus 1 ejects ink onto the powder layer PW[1] and cures the ink along with the powders so as to form the shaping body LY[1] in the powder layer PW[1]. As illustrated in FIG. 3E, the solid object shaping apparatus 1 forms the powder layer PW[2] on the powder layer PW[1] including the shaping body LY[1]. Next, as illustrated in FIG. 3F, the solid object shaping apparatus 1 ejects ink onto the powder layer PW[2] and cures the ink along with the powders so as to form the shaping body LY[2] in the powder layer PW[2].

As mentioned above, the solid object shaping apparatus 1 according to the present embodiment forms the shaping body LY[q] corresponding to the designation data SD[q] in the powder layer PW[q], and shapes the solid object Obj by sequentially laminating the shaping bodies LY[1] to LY[Q]. Among the powders constituting the powder layers PW[1] to PW[Q], powders which do not constitute the solid object Obj may be removed after the solid object Obj is shaped.

Meanwhile, the model data Dat according to the present embodiment designates a shape (a shape of a contour) of the outer surface SF of the model of the solid object Obj. For this reason, in a case where the solid object Obj having the shape indicated by the model data Dat is faithfully shaped, a shape of the solid object Obj is a hollow shape of only a contour without thickness. However, in a case where the solid object Obj is shaped, a more inner shape than the outer surface SF is preferably determined in consideration of the intensity or the like of the solid object Obj. Specifically, in a case where the solid object Obj is shaped, a part of a more inner region than the outer surface SF of the solid object Obj or the entire region preferably has a solid structure.

For this reason, as illustrated in FIGS. 2A-2E and FIGS. 3A-3F, the designation data generation portion 93 according to the present embodiment generates the section model data Ldat which causes a part of a more inner region than the outer surface SF or the entire region to have a solid structure regardless of a shape designated by the model data Dat is a hollow shape.

Hereinafter, in the data generation process, a process of complementing a hollow portion of a shape of a model indicated by the model data Dat and generating the section model data Ldat which causes a shape of a part of or the entire hollow portion to have a solid structure, is referred to as a shape complementing process. The shape complementing process, and a more inner structure than the outer surface SF designated by the section model data Ldat will be described later in detail.

Meanwhile, in the example illustrated in FIGS. 2A-2E, a voxel Vx[1] constituting the shaping body LY[1] formed in the first laminate process is present in the −Z direction (hereinafter, the −Z direction is referred to as a "lower side" or a "lower direction") of a voxel Vx[2] constituting the shaping body LY[2] formed in the second laminate process. However, the voxel Vx[1] may not be present under the voxel Vx[2] depending on a shape of the solid object Obj. In this case, even if a dot is formed in the voxel Vx[2], the dot may be formed on a side lower than a position where the dot is originally to be formed. Therefore, in a case where "q is equal to or greater than 2", in order to form the voxel Vxq in which a dot constituting the shaping body LY[q] is to be inherently formed, a support for supporting the dot formed in the voxel Vx[q] is required to be provided at at least a part of the lower side of the voxel Vx[q].

Therefore, in the present embodiment, the section model data Ldat includes data defining a shape of the support which is necessary during shaping of the solid object Obj in addition to the data regarding the solid object Obj. In other words, in the present embodiment, the shaping body LY[q] includes a portion of the solid object Obj which is to be formed in a q-th laminate process and a portion of the support which is to be formed in the q-th laminate process. In other words, the designation data SD[q] includes data which indicates a shape and a color of the portion of the solid object Obj formed as the shaping body LY[q], as a set of voxels Vx[q], and data which indicates a shape of the portion of the support formed as the shaping body LY[q], as a set of voxels Vx[q].

The designation data generation portion 93 according to the present embodiment determines whether or not the support is required to be provided in order to form the voxel Vx[q] on the basis of the model data Dat. If a result of the determination is affirmative, the designation data generation portion 93 generates the section model data Ldat which causes both the solid object Obj and the support to be provided.

The support is preferably made of a material which is easily removed after the solid object Obj is shaped, for example, water-soluble ink, or ink having a melting point lower than that of ink used to shape the solid object Obj.

1.2 Solid Object Shaping Apparatus

Figure 4:
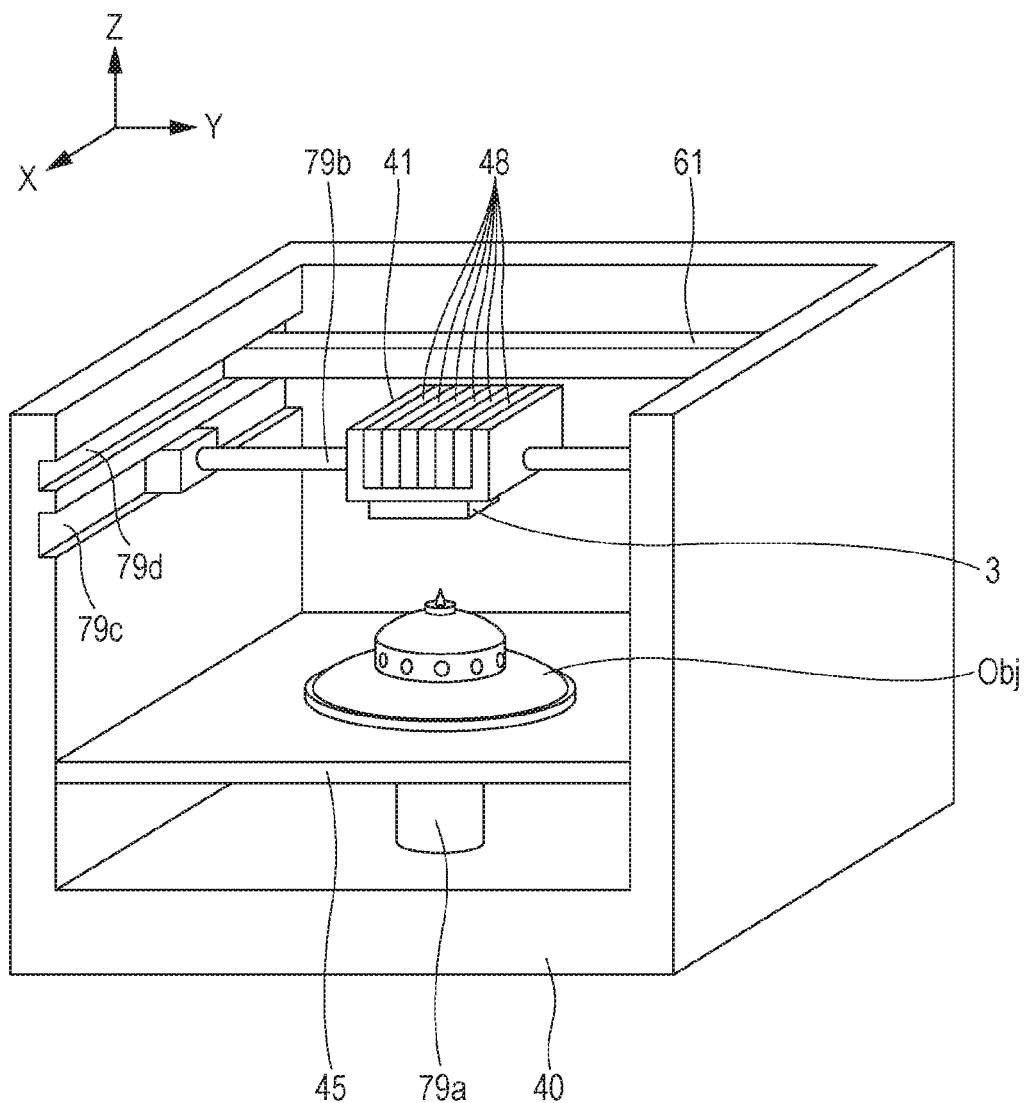
FIG. 4 is a schematic sectional view of a solid object shaping apparatus 1.

Next, the solid object shaping apparatus 1 will be described with reference to FIGS. 1 and 4. FIG. 4 is a perspective view illustrating a schematic structure of the solid object shaping apparatus 1.

As illustrated in FIGS. 1 and 4, the solid object shaping apparatus 1 includes a casing 40; a shaping platform 45; a control portion 6 which controls an operation of each unit of the solid object shaping apparatus 1; a head unit 3 provided with a recording head 30 including an ejecting portion D which ejects ink toward the shaping platform 45; a curing unit 61 which cures the ink ejected on the shaping platform 45; six ink cartridges 48 which store ink; a carriage 41 in which the head unit 3 and the ink cartridges 48 are mounted; a powder layer forming portion (not illustrated) which causes powders for forming a powder layer PW to be sprayed so that the powders are spread with a predetermined thickness ΔZ on the shaping platform 45, and thus the powder layer PW is formed; a powder removing portion (not illustrated) which removes remaining powders which do not constitute the solid object Obj after the solid object Obj is formed; a position changing mechanism 7 which changes positions of the head unit 3, the shaping platform 45, and the curing unit 61 with respect to the casing 40; and a storage portion 60 which stores the control program for the solid object shaping apparatus 1 and other various information.

The control portion 6 and the designation data generation portion 93 function as a system controller 101 which controls an operation of each portion of the solid object shaping system 100.

The curing unit 61 is a constituent element which cures ink ejected on the shaping platform 45, and may be, for example, a light source which irradiates ultraviolet curable ink with ultraviolet rays, or a heater which heats resin ink. In a case where the curing unit 61 is an ultraviolet light source, the curing unit 61 may be provided, for example, over (+Z direction) of the shaping platform 45. Hereinafter, a description will be made assuming that the curing unit 61 is an ultraviolet light source, and the curing unit 61 is located in the +Z direction of the shaping platform 45.

The six ink cartridges 48 are provided so as to correspond to a total of six types of ink including five color types of shaping ink for shaping the solid object Obj and support ink for forming a support with a one-to-one relationship. Each of the ink cartridges 48 stores the type of ink corresponding to the ink cartridge 48.

The five color types of shaping ink for shaping the solid object Obj include chromatic ink containing a chromatic colorant component, achromatic ink containing an achromatic colorant component, and clear (CL) ink in which the content of a colorant component per unit weight or per unit volume is smaller than that of the chromatic ink and the achromatic ink.

In the present embodiment, three color types of ink including cyan (CY) ink, magenta (MG) ink, and yellow (YL) ink are employed as the chromatic ink.

In the present embodiment, white (WT) ink is employed as the achromatic ink.

The white ink according to the present embodiment is ink which reflects 30% or higher of applied light, preferably 50% or higher, and more preferably 80% or higher in a case where the light having a wavelength included in a wavelength region (roughly, 400 nm to 700 nm) of visible light is applied to the white ink.

In the present embodiment, the clear ink has the content of a colorant component lower than that of the chromatic ink and the achromatic ink and is thus highly transparent.

Hereinafter, among the five types of shaping ink, the three types of chromatic ink and the single type of achromatic ink are collectively referred to as coloring ink in some cases. In other words, in the present embodiment, a case is assumed in which the solid object shaping apparatus 1 can eject four types of coloring ink.

Hereinafter, among the five types of shaping ink which can be ejected by the solid object shaping apparatus 1, ink having a certain color (hereinafter, referred to as a "first color") used to reproduce a color (hereinafter, referred to as a "designated color") designated for a model indicated by the model data Dat is referred to as a "first liquid". Among the five types of shaping ink, ink having a color (hereinafter, referred to as a "second color") which is different from the first color among colors used to reproduce a designated color is referred to as a "second liquid". Hereinafter, a description will be made assuming that the first liquid is chromatic ink, and the second liquid is clear ink.

In the present embodiment, each of the ink cartridges 48 is mounted in the carriage 41 but may be provided at other locations of the solid object shaping apparatus 1 instead of being mounted in the carriage 41.

As illustrated in FIGS. 1 and 4, the position changing mechanism 7 includes a lifting mechanism driving motor 71 for driving a shaping platform lifting mechanism 79a which moves up and down the shaping platform 45 in the +Z direction and the −Z direction (hereinafter, the +Z direction and the −Z direction are collectively referred to as a "Z axis direction" in some cases); a carriage driving motor 72 for moving the carriage 41 along a guide 79b in the +Y direction and the −Y direction (hereinafter, the +Y direction and the −Y direction are collectively referred to as a "Y axis direction" in some cases); a carriage driving motor 73 for moving the carriage 41 along a guide 79c in the +X direction and the −X direction (hereinafter, the +X direction and the −X direction are collectively referred to as a "X axis direction" in some cases); and a curing unit driving motor 74 for moving the curing unit 61 along a guide 79d in the +X direction and the −X direction. The position changing mechanism 7 also includes a motor driver 75 which drives the lifting mechanism driving motor 71; a motor driver 76 which drives the carriage driving motor 72; a motor driver 77 which drives the carriage driving motor 73; and a motor driver 78 which drives the curing unit driving motor 74.

The storage portion 60 includes an electrically erasable programmable read-only memory (EEPROM) which is a kind of nonvolatile memory storing the designation data SD supplied from the host computer 9; a random access memory (RAM) which temporarily stores data required to perform various processes such as the shaping process of shaping the solid object Obj or in which the control program for controlling each portion of the solid object shaping apparatus 1 is temporarily developed in order to perform various processes such as the shaping process; and a PROM which is a kind of nonvolatile memory storing the control program.

The control portion 6 is configured to include a central processing unit (CPU) or a field-programmable gate array (FPGA), and controls an operation of each portion of the solid object shaping apparatus 1 when the CPU or the like operates according to the control program stored in the storage portion 60.

In a case where the designation data SD is supplied from the host computer 9, the control portion 6 controls operations of the head unit 3 and the position changing mechanism 7, and thus controls execution of the shaping process of shaping the solid object Obj corresponding to the model data Dat on the shaping platform 45.

Specifically, first, the control portion 6 stores the designation data SD supplied from the host computer 9 in the storage portion 60. Next, the control portion 6 controls an operation of the head unit 3 on the basis of various data such as the designation data SD stored in the storage portion 60, generates and outputs a driving waveform signal Com and a waveform designation signal SI for driving the ejecting portion D, and outputs the generated signals. The control portion 6 generates various signals for controlling operations of the motor drivers 75 to 78 on the basis of various data such as the designation data SD stored in the storage portion 60, and outputs the generated signals.

The driving waveform signal Com is an analog signal. For this reason, the control portion 6, which includes a DA conversion circuit (not illustrated), converts digital driving waveform signals generated by the CPU and the like included in the control portion 6 into analog driving waveform signals Com and outputs the converted signals.

As mentioned above, the control portion 6 controls a position of the head unit 3 relative to the shaping platform 45 via control of the motor drivers 75, 76 and 77, and controls a position of the curing unit 61 relative to the shaping platform 45 via control of the motor drivers 75 and 78. The control portion 6 controls whether or not ink is ejected from the ejecting portion D, an amount of ink to be ejected, ink ejection timing, and the like via control of the head unit 3.

Consequently, the control portion 6 controls execution of the laminate process in which dots are formed in the powder layer PW on the shaping platform 45 while adjusting sizes and arrangement of the dots, and the shaping body LY is formed by curing the dots formed in the powder layer PW. The control portion 6 controls execution of the shaping process in which new shaping bodies LY are laminated on the shaping body LY which has already been formed by repeatedly performing the laminate process, and thus the solid object Obj corresponding to the model data Dat is formed.

As illustrated in FIG. 1, the head unit 3 includes the recording head 30 provided with M ejecting portions D, and a driving signal generation portion 31 which generates a driving signal Vin for driving the ejecting portion D (where M is a natural number of 1 or greater). Hereinafter, in order to differentiate the M ejecting portions D provided in the recording head 30 from each other, ejecting portions D are sequentially referred to as a first stage ejecting portion D, a second stage ejecting portion D, . . . , and an M-th stage ejecting portion D in some cases. In addition, hereinafter, an m-th ejecting portion D of the M ejecting portions D provided in the recording head 30 is referred to as an ejecting portion D[m] in some cases (where m is a natural number which is equal to or greater than 1 and is equal to or smaller than M). Hereinafter, a driving signal Vin for driving the ejecting portion D[m] among the driving signals Vin generated by the driving signal generation portion 31 is referred to as a driving signal Vin[m] in some cases. Details of the driving signal generation portion 31 will be described later.

1.3 Recording Head

Next, with reference to FIGS. 5 to 7, a description will be made of the recording head 30 and the ejecting portion D provided in the recording head 30.

Figure 5:
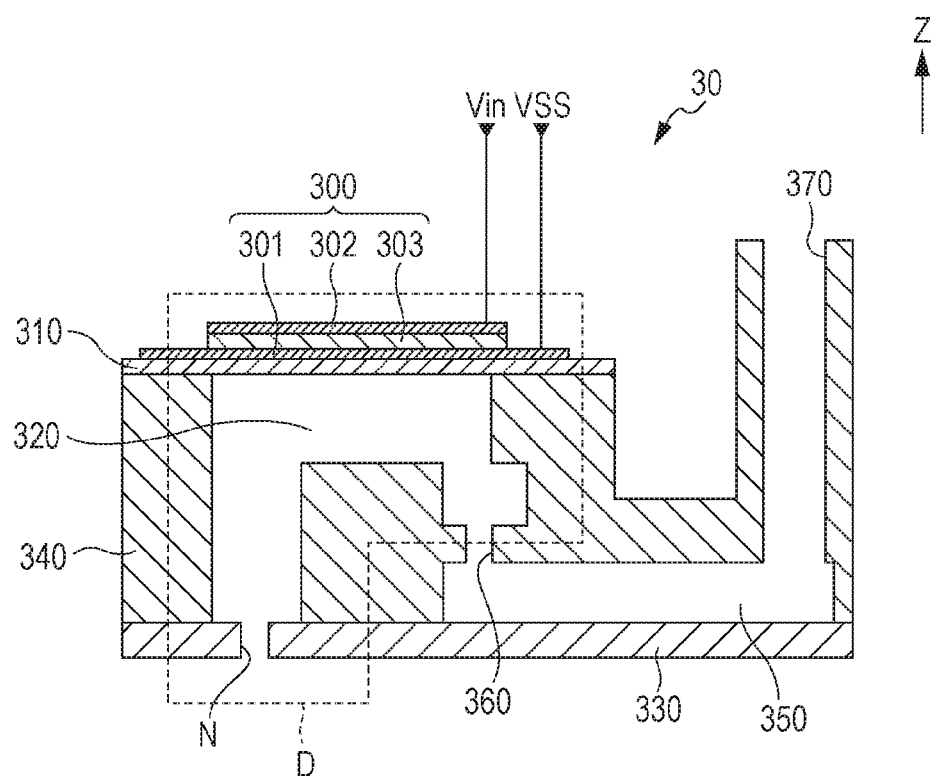
FIG. 5 is a schematic sectional view of a recording head 30.

FIG. 5 illustrates an example of a schematic partial sectional view of the recording head 30. For convenience of illustration, in the recording head 30, FIG. 5 illustrates one ejecting portion D of the M ejecting portions D included in the recording head 30, a reservoir 350 which communicates with the one ejecting portion D via an ink supply port 360, and an ink intake port 370 for supplying ink from the ink cartridge 48 to the reservoir 350.

As illustrated in FIG. 5, the ejecting portion D includes a piezoelectric element 300, a cavity 320 filled with ink, a nozzle N which communicates with the cavity 320, and a vibration plate 310. In the ejecting portion D, the piezoelectric element 300 is driven by the driving signal Vin, and thus the ink in the cavity 320 is ejected from the nozzle N. The cavity 320 is a space partitioned by a cavity plate 340 which is molded in a predetermined shape having a recess, and a nozzle plate 330 in which the nozzle N is formed, and the vibration plate 310. The cavity 320 communicates with the reservoir 350 via the ink supply port 360. The reservoir 350 communicates with one ink cartridge 48 via the ink intake port 370.

In the present embodiment, as the piezoelectric element 300, for example, a unimorph (monomorph) type piezoelectric element as illustrated in FIG. 4 is used. However, the piezoelectric element 300 is not limited to the unimorph type piezoelectric element, and may be a piezoelectric element which can eject a liquid such as ink through deformation of the piezoelectric element 300, such as a bimorph type or laminate type piezoelectric element.

The piezoelectric element 300 includes a lower electrode 301, an upper electrode 302, and a piezoelectric body 303 provided between the lower electrode 301 and the upper electrode 302. If a potential of the lower electrode 301 is set to a predetermined reference potential VSS, and the driving signal Vin is supplied to the upper electrode 302 so that a voltage is applied between the lower electrode 301 and the upper electrode 302, the piezoelectric element 300 is displaced in a vertical direction in the figure according to the applied voltage, and thus the piezoelectric element 300 vibrates.

The vibration plate 310 is provided on an upper opening of the cavity plate 340, and the lower electrode 301 is joined to the vibration plate 310. For this reason, if the piezoelectric element 300 vibrates according to the driving signal Vin, the vibration plate 310 also vibrates. A volume of the cavity 320 (pressure in the cavity 320) is changed due to the vibration of the vibration plate 310, and thus the ink filling the cavity 320 is ejected from the nozzle N. If an amount of the ink in the cavity 320 is reduced, ink is supplied from the reservoir 350. In addition, ink is supplied to the reservoir 350 from the ink cartridge 48 via the ink intake port 370.

Figure 6A:
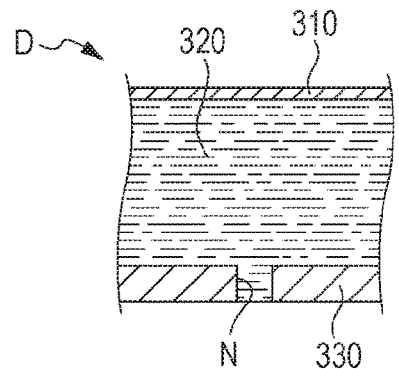
FIG. 6A is a diagram for explaining an operation of an ejecting portion D when a driving signal Vin is supplied.
Figure 6B:
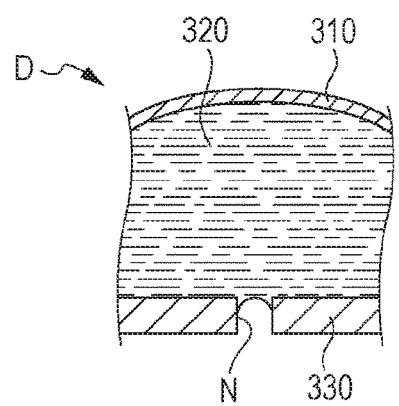
FIG. 6B is a diagram for explaining an operation of an ejecting portion D when a driving signal Vin is supplied.
Figure 6C:
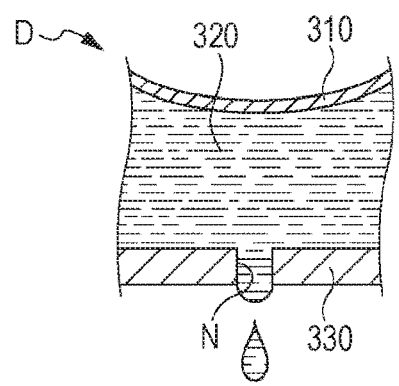
FIG. 6C is a diagram for explaining an operation of an ejecting portion D when a driving signal Vin is supplied.

FIGS. 6A to 6C are diagrams for explaining an operation of ejecting ink from the ejecting portion D. In a state illustrated in FIG. 6A, if the driving signal Vin is supplied to the piezoelectric element 300 of the ejecting portion D from the driving signal generation portion 31, distortion corresponding to an electric field applied between the electrodes occurs in the piezoelectric element 300, and thus the vibration plate 310 of the ejecting portion D is bent upward in the figure. Consequently, the volume of the cavity 320 of the ejecting portion D increases as illustrated in FIG. 6B compared with the initial state illustrated in FIG. 6A. In a state illustrated in FIG. 6B, if a potential indicated by the driving signal Vin is changed, the vibration plate 310 is restored by an elastic restoring force thereof so as to be moved downward in the figure exceeding the position of the vibration plate 310 in the initial state, and thus the volume of the cavity 320 rapidly decreases as illustrated in FIG. 6C. At this time, some of the ink filling the cavity 320 is ejected as ink droplets from the nozzle N which communicates with the cavity 320 due to compression pressure occurring in the cavity 320.

Figure 7:
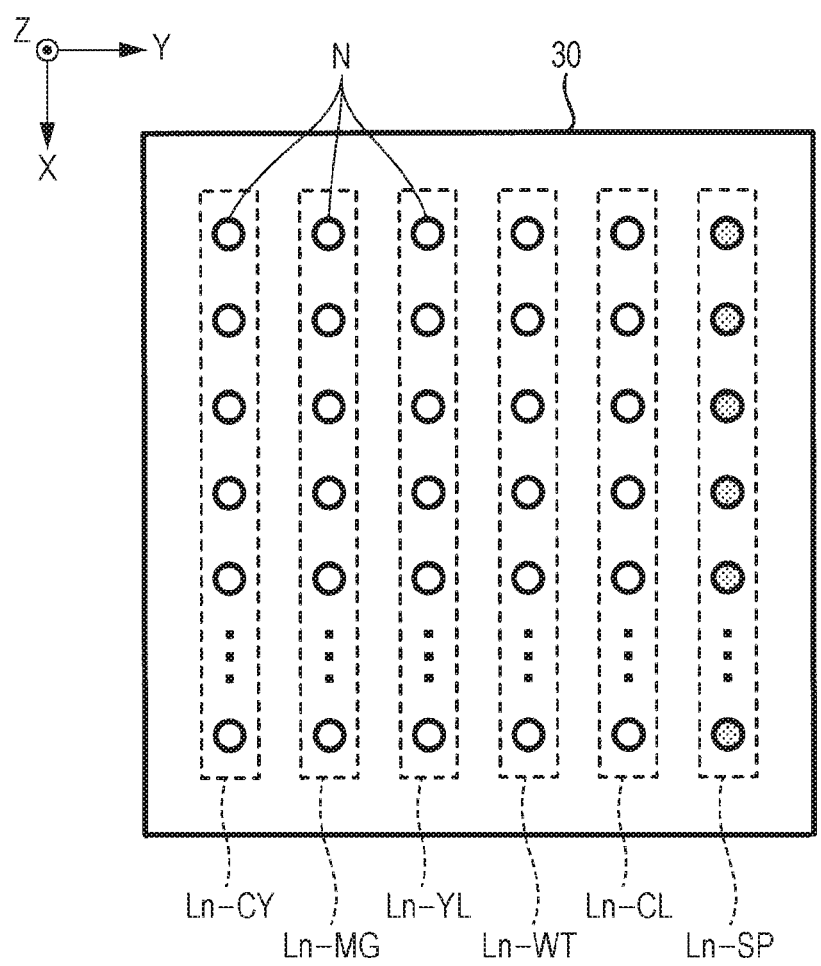
FIG. 7 is a plan view illustrating an arrangement example of nozzles N in the recording head 30.

FIG. 7 is a diagram for explaining an example of arrangement of M nozzles N provided on the recording head 30 in a plan view of the recording head 30 from the +Z direction or −Z direction.

As illustrated in FIG. 7, the recording head 30 is provided with six nozzle strings Ln formed of a plurality of nozzles N. Specifically, the recording head 30 is provided with the six nozzle strings Ln including a nozzle string Ln-CY, a nozzle string Ln-MG, a nozzle string Ln-YL, a nozzle string Ln-WT, a nozzle string Ln-CL, and a nozzle string Ln-SP.

Here, the nozzles N included in the nozzle string Ln-CY are nozzles N provided in the ejecting portion D which ejects cyan (CY) ink; the nozzles N included in the nozzle string Ln-MG are nozzles N provided in the ejecting portion D which ejects magenta (MG) ink; the nozzles N included in the nozzle string Ln-YL are nozzles N provided in the ejecting portion D which ejects yellow (YL) ink; the nozzles N included in the nozzle string Ln-WT are nozzles N provided in the ejecting portion D which ejects white (WT) ink; the nozzles N included in the nozzle string Ln-CL are nozzles N provided in the ejecting portion D which ejects clear (CL) ink; and the nozzles N included in the nozzle string Ln-SP are nozzles N provided in the ejecting portion D which ejects support ink.

In the present embodiment, as illustrated in FIG. 7, a case is exemplified in which the plurality of nozzles N included in each nozzle string Ln are disposed to be arranged in a column in the X axis direction. However, for example, some (for example, even-numbered nozzles N) of the plurality of nozzles N included in each nozzle string Ln and the other nozzles N (for example, odd-numbered nozzles N) may be different from each other in positions in the Y axis direction, that is, may be disposed in a so-called zigzag shape. In each nozzle string Ln, an interval (pitch) between the nozzles N may be set as appropriate according to printing resolution (dot per inch: dpi).

1.4 Driving Signal Generation Portion

Next, with reference to FIGS. 8 to 10, a description will be made of a configuration and an operation of the driving signal generation portion 31.

Figure 8:
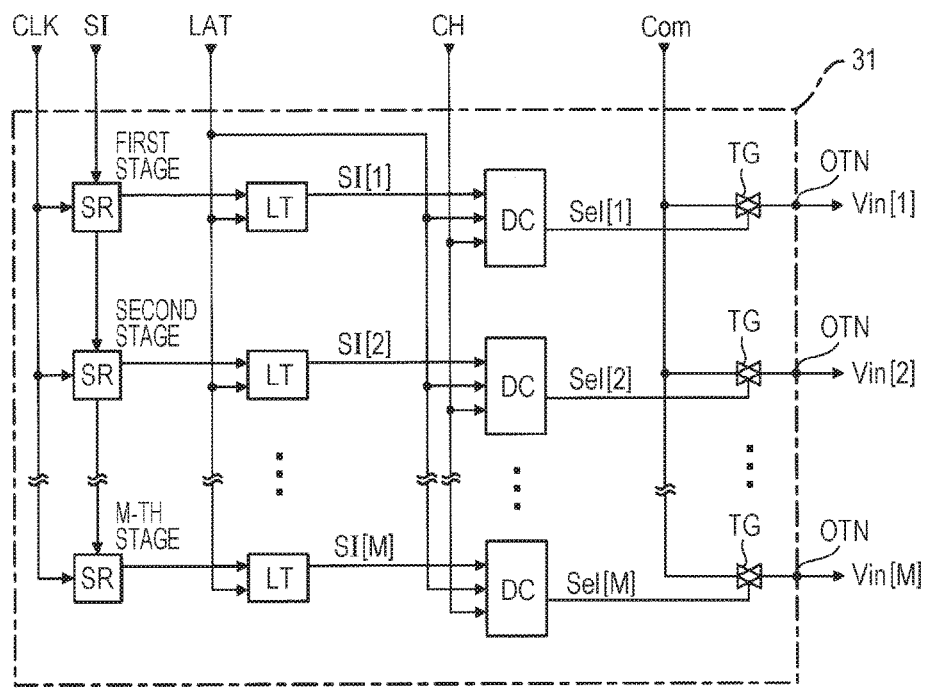
FIG. 8 is a block diagram illustrating a configuration of a driving signal generation portion 31.

FIG. 8 is a block diagram illustrating a configuration of the driving signal generation portion 31.

As illustrated in FIG. 8, the driving signal generation portion 31 is provided with M sets each of which includes a shift register SR, a latch circuit LT, a decoder DC, and a transmission gate TG, so as to respectively correspond to the M ejecting portions D provided in the recording head 30. Hereinafter, the respective elements constituting in the M sets included in the driving signal generation portion 31 and the recording head 30 are sequentially referred to as first stage elements, second stage elements, . . . , and M-th stage elements from the top in the figure.

A clock signal CLK, a waveform designation signal SI, a latch signal LAT, a change signal CH, and a driving waveform signal Com are supplied to the control portion 6 from the driving signal generation portion 31.

The waveform designation signal SI is a digital signal which is defined on the basis of the designation data SD and designates whether or not ink is to be ejected from the ejecting portion D and an amount of ink to be ejected from the ejecting portion D, and includes waveform designation signals SI[1] to SI[M]. Among the signals, the waveform designation signal SI[m] defines whether or not ink is to be ejected from the ejecting portion D[m], and an amount of ink to be ejected, in two bits including a high-order bit b1 and a low-order bit b2. Specifically, the waveform designation signal SI[m] designates any one of ejection of ink in an amount corresponding to a large dot, ejection of ink in an amount corresponding to a small dot, and non-ejection of ink, for the ejecting portion D[m].

Each of the shift registers SR temporarily holds a 2-bit waveform designation signal SI[m] corresponding to each stage among the waveform designation signals SI (SI[1] to SI[M]). Specifically, the M shift registers SR including the first, second, . . . and M-th stage shift registers SR which respectively correspond to the M ejecting portions D[1] to D[M] are connected to each other in the vertical direction. In addition, the waveform designation signals SI which are serially supplied are transmitted to the subsequent stages according to the clock signal CLK. In a case where the waveform designation signals SI have been transmitted to all of the M shift registers SR, each of the M shift registers SR holds the 2-bit waveform designation signal SI[m] corresponding thereto among the waveform designation signals SI.

The M latch circuits LT simultaneously latch the 2-bit waveform designation signal SI[m], corresponding to the respective stages, held in the M shift registers SR, at a rising timing of the latch signal LAT.

Meanwhile, an operation period which is a period in which the solid object shaping apparatus 1 performs the shaping process includes a plurality of unit periods Tu. In the present embodiment, each of the unit periods Tu is formed of two control periods Ts (Ts1 and Ts2). In the present embodiment, the two control periods Ts1 and Ts2 have the same duration. As will be described later in detail, the unit period Tu is defined by the latch signal LAT, and the control period Ts is defined by the latch signal LAT and the change signal CH.

The control portion 6 supplies the waveform designation signal SI to the driving signal generation portion 31 at a timing before the unit period Tu starts. The control portion 6 supplies the latch signal LAT to each latch circuit LT of the driving signal generation portion 31 so that the waveform designation signal SI[m] is latched for each unit period Tu.

The m-th stage decoder DC decodes the 2-bit waveform designation signal SI[m] latched by the m-th latch circuit LT, and outputs a selection signal Sel[m] which is set to either a high level ("H" level) or a low level ("L" level) in each of the control periods Ts1 and Ts2.

Figures 9, 10:
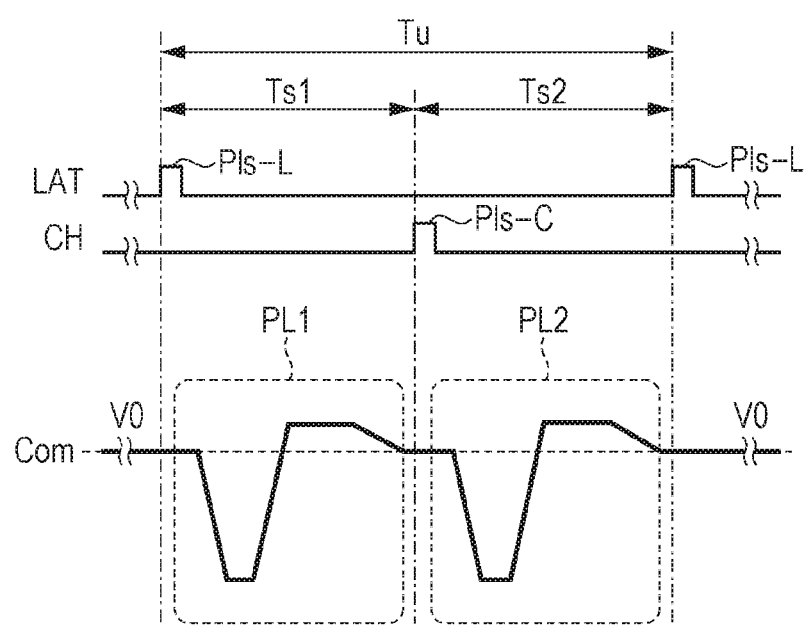
FIG. 9 is a diagram illustrating the content of a selection signal Sel.
FIG. 10 is a timing chart illustrating a waveform of a driving waveform signal Com.

FIG. 9 is a diagram for explaining the content decoded by the decoder DC. As illustrated in FIG. 9, the m-th stage decoder DC sets the selection signal Sel[m] to an "H" level in the control periods Ts1 and Ts2 if the content indicated by the waveform designation signal SI[m] is (b1, b2)=(1, 1). The m-th stage decoder DC sets the selection signal Sel[m] to an "H" level in the control period Ts1 and sets the selection signal Sel[m] to an "L" level in the control period Ts2 if the content indicated by the waveform designation signal SI[m] is (b1, b2)=(1, 0). The m-th stage decoder DC sets the selection signal Sel[m] to an "L" level in the control periods Ts1 and Ts2 if the content indicated by the waveform designation signal SI[m] is (b1, b2)=(0, 0).

As illustrated in FIG. 8, the M transmission gates TG included in the driving signal generation portion 31 are provided so as to respectively correspond to the M ejecting portions D. The m-th stage transmission gate TG is turned on when the selection signal Sel[m] output from the m-th stage decoder DC is in an "H" level, and is turned off when the selection signal Sel[m] is in an "L" level. The driving waveform signal Com is supplied to one end of each transmission gate TG.

The other end of the m-th stage transmission gate TG is electrically connected to an m-th stage output end OTN.

If the selection signal Sel[m] is brought into an "H" level, and thus the m-th stage transmission gate TG is turned on, the driving waveform signal Com is supplied from the m-th stage output end OTN to the ejecting portion D[m] as the driving signal Vin[m].

In the present embodiment, a potential of the driving waveform signal Com is set to a reference potential V0 at timings at which the transmission gate TG is switched from an ON state to an OFF state, that is, start and end timings of the control periods Ts. For this reason, in a case where the transmission gate TG is turned off, a potential of the output end OTN is maintained in the reference potential V0 due to the capacity of the piezoelectric element 300 of the ejecting portion D[m]. Hereinafter, for convenience of description, the description will be made assuming that, if the transmission gate TG is turned off, a potential of the driving signal Vin[m] is maintained as the reference potential V0.

As described above, the control portion 6 controls the driving signal generation portion 31 so that the driving signal Vin is supplied to each ejecting portion D for each unit period Tu. Consequently, each ejecting portion D can eject ink in an amount corresponding to a value indicated by the waveform designation signal SI which is defined on the basis of the waveform designation signal SI, and can thus form dots on the shaping platform 45.

FIG. 10 is a timing chart for explaining various signals which are supplied from the control portion 6 to the driving signal generation portion 31 in each unit period Tu.

As exemplified in FIG. 10, the latch signal LAT includes a pulse waveform Pls-L, and the unit period Tu is defined by the pulse waveform Pls-L. The change signal CH includes a pulse waveform Pls-C, and the unit period Tu is divided into the control periods Ts1 and Ts2 by the pulse waveform Pls-C. Although not illustrated, the control portion 6 serially supplies the waveform designation signal SI to the driving signal generation portion 31 in synchronization with the clock signal CLK for each unit period Tu.

As exemplified in FIG. 10, the driving waveform signal Com includes a waveform PL1 disposed in the control period Ts1, and a waveform PL2 disposed in the control period Ts2. Hereinafter, the waveforms PL1 and PL2 are collectively referred to as a waveform PL in some cases. In the present embodiment, a potential of the driving waveform signal Com is set to the reference potential V0 at the start or end timing of each control period Ts.

In a case where the selection signal Sel[m] is in an "H" level in a certain control period Ts, the driving signal generation portion 31 supplies the waveform PL of the driving waveform signal Com disposed in the control period Ts to the ejecting portion D[m] as the driving signal Vin[m]. Conversely, in a case where the selection signal Sel[m] is in an "L" level in a certain control period Ts, the driving signal generation portion 31 supplies the waveform PL of the driving waveform signal Com set to the reference potential V0 to the ejecting portion D[m] as the driving signal Vin[m].

Therefore, the driving signal Vin[m] supplied to the ejecting portion D[m] in the unit period Tu by the driving signal generation portion 31 becomes a signal having the waveforms PL1 and PL2 if a value indicated by the waveform designation signal SI[m] is (b1, b2)=(1, 1). The driving signal Vin[m] becomes a signal having the waveform PL1 if a value indicated by the waveform designation signal SI[m] is (b1, b2)=(1, 0). The driving signal Vin[m] becomes a signal set to the reference potential V0 if a value indicated by the waveform designation signal SI[m] is (b1, b2)=(0, 0).

If the driving signal Vin[m] having a single waveform PL is supplied, the ejecting portion D[m] ejects about a small amount of ink so as to form a small dot.

For this reason, in a case where a value indicated by the waveform designation signal SI[m] is (b1, b2)=(0, 1) and the driving signal Vin[m] supplied to the ejecting portion D[m] has a single waveform PL (PL1) in the unit period Tu, about a small amount of ink is ejected from the ejecting portion D[m] on the basis of the single waveform PL, and thus a small dot is formed by the ejected ink.

In a case where a value indicated by the waveform designation signal SI[m] is (b1, b2)=(1, 1) and the driving signal Vin[m] supplied to the ejecting portion D[m] has two waveforms PL (PL1 and PL2) in the unit period Tu, about a small amount of ink is ejected from the ejecting portion D[m] twice on the basis of the two waveforms PL, and a large dot is formed through combination of about a small amount of ink ejected twice.

On the other hand, in a case where a value indicated by the waveform designation signal SI[m] is (b1, b2)=(0, 0) and the driving signal Vin[m] supplied to the ejecting portion D[m] is maintained in the reference potential V0 without the waveform PL in the unit period Tu, ink is not ejected from the ejecting portion D[m], and thus no dot is formed (recording is not performed).

In the present embodiment, the waveform PL of the driving waveform signal Com is defined so that about a small amount of ink ejected for forming a small dot is substantially a half of an amount of ink which is necessary in order to form a block BL. In other words, the block BL is formed of either one of two patterns including a single large dot and two small dots.

In the present embodiment, a single block BL is provided in a single voxel Vx. That is, in the present embodiment, dots are formed in a single voxel Vx in either one of two patterns including a single large dot and two small dots.

2. Data Generation Process and Shaping Process

Next, with reference to FIGS. 11 to 16, a description will be made of the data generation process and the shaping process performed by the solid object shaping system 100.

2.1 Summary of Data Generation Process and Shaping Process

Figure 11:
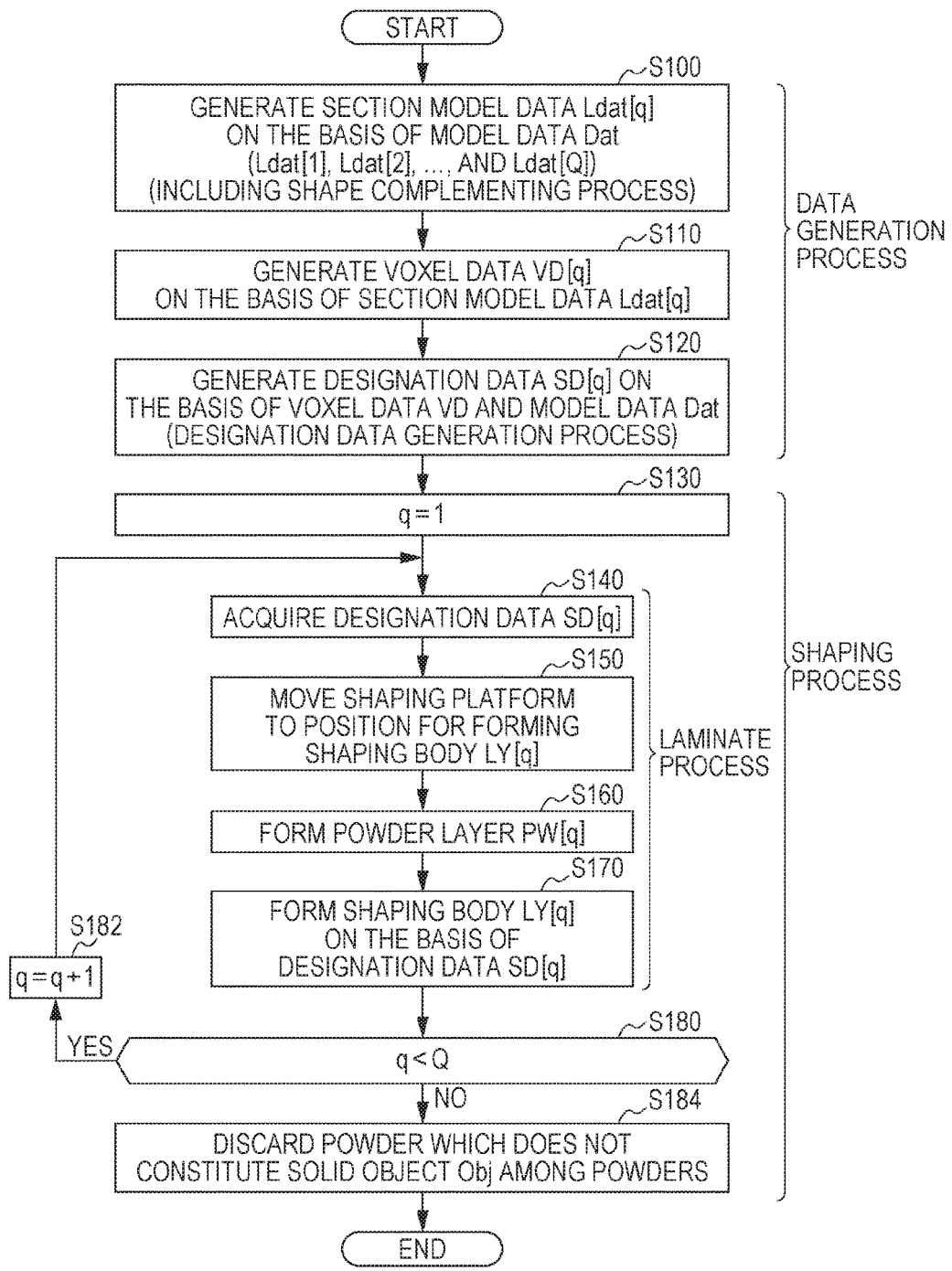
FIG. 11 is a flowchart illustrating a data generation process and a shaping process.

FIG. 11 is a flowchart illustrating an example of an operation of the solid object shaping system 100 in a case where the data generation process and the shaping process are performed.

The data generation process is a process performed by the designation data generation portion 93 of the host computer 9, and is started when the designation data generation portion 93 acquires the model data Dat output from the model data generation portion 92. Processes in steps S100, S110 and S120 illustrated in FIG. 11 correspond to the data generation process.

As illustrated in FIG. 11, if the data generation process is started, the designation data generation portion 93 generates the section model data Ldat[q] (Ldat[1] to Ldat[Q]) on the basis of the model data Dat output from the model data generation portion 92 (S100). As described above, in step S100, the designation data generation portion 93 performs the shape complementing process of complementing a hollow portion of a shape indicated by the model data Dat is complemented, and generating the section model data Ldat which causes a part of a more inner region than an outer surface SF of a model of the solid object Obj indicated by the model data Dat or the entire region to have a solid shape. Details of the shape complementing process will be described later.

Next, the designation data generation portion 93 generates discrete voxel data VD[q] obtained by discretizing a shape and a color represented by a section of a model indicated by the section model data Ldat[q] in the unit of the voxel Vx (S110).

Next, the designation data generation portion 93 performs a designation data generation process of determining a block BL (that is, arrangement of dots to be formed by the solid object shaping apparatus 1) to be formed by the solid object shaping apparatus 1 in order to form the shaping body LY[q] on the basis of the voxel data VD and the model data Dat, and generating the designation data SD[q] on the basis of a determination result (S120). Details of the designation data generation process will be described later.

As mentioned above, the designation data generation portion 93 performs the data generation process indicated by steps S100 to S120 of FIG. 11.

The solid object shaping system 100 performs the data generation process and then performs the shaping process.

The shaping process is a process performed by the solid object shaping apparatus 1 under the control of the control portion 6, and is started when the designation data SD output from the host computer 9 is acquired by the solid object shaping apparatus 1 and is stored in the storage portion 60. Processes in steps S130 to S184 illustrated in FIG. 11 correspond to the shaping process.

As illustrated in FIG. 11, the control portion 6 sets a variable q indicating the number of laminate processes to be performed to "1" (S130).

Next, the control portion 6 acquires the designation data SD[q] generated by the designation data generation portion 93 from the storage portion 60 (S140). The control portion 6 controls the lifting mechanism driving motor 71 so that the shaping platform 45 is moved to a position for forming the shaping body LY[q] (S150).

The position of the shaping platform 45 for forming the shaping body LY[q] may be any position as long as ink ejected from the head unit 3 can be landed at the position with respect to a dot formation location (voxel Vx[q]) indicated by the designation data SD[q]. For example, in step S150, the control portion 6 may control a position of the shaping platform 45 so that a gap between the shaping body LY[q] and the head unit 3 in the Z axis direction is made constant. In this case, the control portion 6 may form the shaping body LY[q] in the q-th laminate process, and then may move the shaping platform 45 by the predetermined thickness ΔZ in the −Z direction until a shaping body LY[q+1] starts to be formed through a (q+1)-th laminate process.

Next, the control portion 6 controls an operation of the powder layer forming portion so that the powder layer PW[q] is formed (S160).

The control portion 6 controls operations of the head unit 3, the position changing mechanism 7, and the curing unit 61 (hereinafter, referred to as the "head unit 3 and the like") so that the shaping body LY[q] corresponding to the designation data SD[q] is formed in the powder layer PW[q] (S170). Specifically, in step S170, first, the control portion 6 generates the waveform designation signal SI on the basis of the designation data SD[q], and controls an operation of the head unit 3 on the basis of the generated waveform designation signal SI so that shaping ink or support ink is ejected onto the powder layer PW[q]. Next, in step S170, the control portion 6 controls of an operation of the curing unit 61 so that the ink ejected on the powder layer PW[q] is cured along with the powders and thus dots are formed. Consequently, the shaping body LY[q] is formed in the powder layer PW[q].

The processes in steps S140 to S170 correspond to the laminate process.

Thereafter, the control portion 6 determines whether or not q is equal to or smaller than Q (S180).

If a determination result in step S180 is affirmative, 1 is added to the variable q, and the process proceeds to step S140 (S182). On the other hand, if a determination result in step S180 is negative, an operation of the powder removing portion is controlled so that remaining powders which do not constitute the solid object Obj are removed, and then the shaping process is finished (S184).

As mentioned above, the designation data generation portion 93 of the solid object shaping system 100 performs the data generation process indicated by steps S100 to S120 of FIG. 11, and thus the designation data SD[1] to SD[Q] is generated on the basis of the model data Dat. The solid object shaping apparatus 1 of the solid object shaping system 100 performs the shaping process indicated by steps S130 to S184 of FIG. 11 under the control of the control portion 6, and thus such a solid object Obj which reproduces a shape and a color of a model indicated by the model data Dat is shaped.

FIG. 11 illustrates only an example of a flow of the data generation process and the shaping process. For example, in FIG. 11, the data generation process is completed and then the shaping process is started, but the invention is not limited to such an aspect, and the shaping process may be started before the data generation process is completed. For example, in a case where the designation data SD[q] is generated in the data generation process, a shaping process (that is, the q-th laminate process) of forming the shaping body LY[q] may be performed after the designation data SD[q] is acquired without waiting for the next designation data SD[q+1] to be generated.

2.2 Shape Complementing Process

As described above, in step S100, the designation data generation portion 93 performs the shape complementing process of complementing a part of or the hollow portion of a shape of the outer surface SF of the model of the solid object Obj designated by the model data Dat and generating the section model data Ldat which causes a part of a more inner region than the outer surface SF of the model of the solid object Obj or the entire region to have a solid structure.

Hereinafter, with reference to FIGS. 12A to 13, a description will be made of a more inner structure than the outer surface SF of the model of the solid object Obj indicated by the section model data Ldat and the shape complementing process of defining the more inner structure than the outer surface SF.

First, with reference to FIGS. 12A and 12B, a description will be made of a more inner structure than the outer surface SF of the model of the solid object Obj indicated by the section model data Ldat.

Figure 12A:
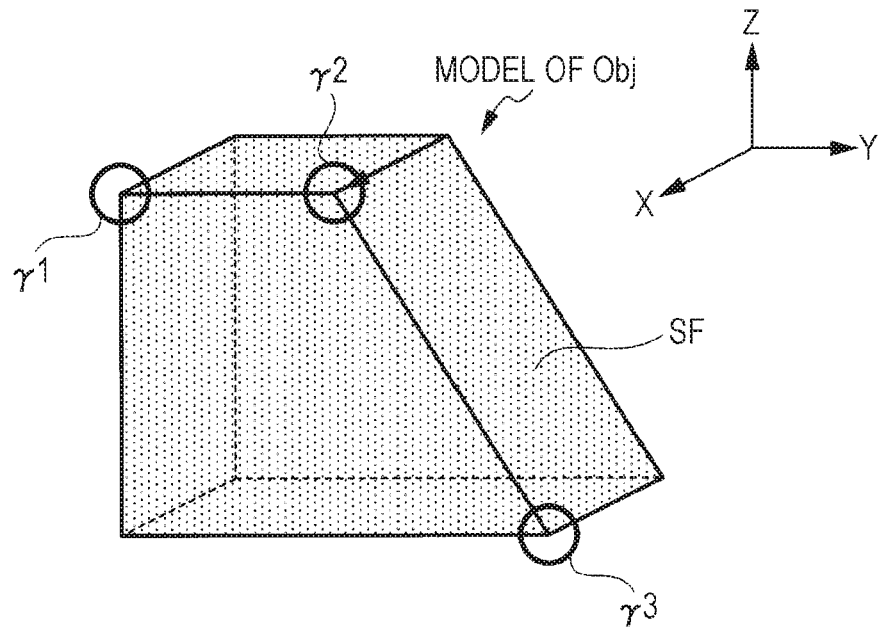
FIG. 12A is a diagram for explaining a solid object Obj.
Figure 12B:
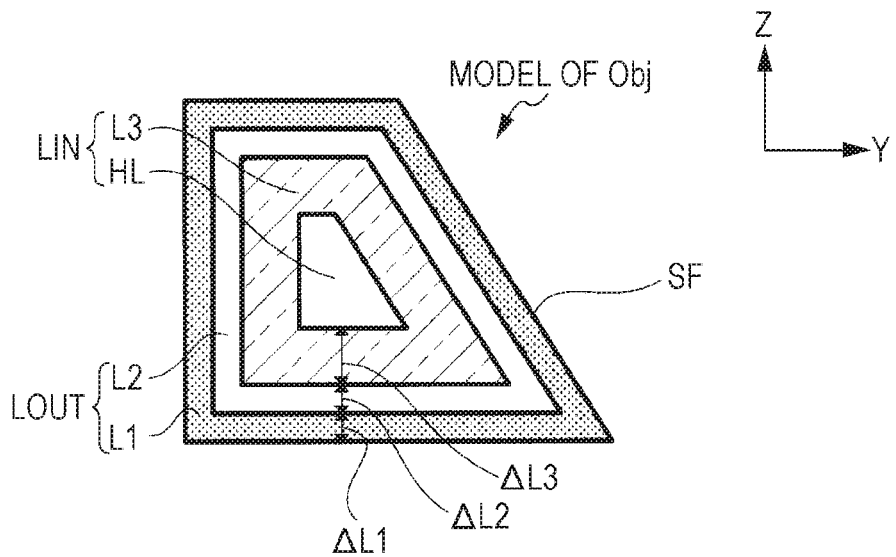
FIG. 12B is a diagram for explaining a solid object Obj.

Here, FIG. 12A is a perspective view of the model of the solid object Obj indicated by the section model data Ldat, and FIG. 12B is a sectional view obtained when cutting the model of the solid object Obj illustrated in FIG. 12A on a plane parallel to the Y axis and the Z axis. In FIGS. 12A and 12B, for convenience of illustration, a case is assumed in which a frustum-shaped solid object Obj having a rectangular upper bottom and a rectangular lower bottom, which is different from that in FIGS. 2 and 3.

As illustrated in FIG. 12B, the solid object Obj shaped on the basis of the section model data Ldat includes a colored layer L1, a shield layer L2, an inner layer L3, and a hollow portion HL which is located further inward than the three layers, in this order toward the inside of the solid object Obj from a surface of the solid object Obj.

Here, the colored layer L1 is a layer which is formed by ink containing shaping ink, and is a layer including the surface of the solid object Obj for representing a color of the solid object Obj. The shield layer L2 is a layer which is formed by using, for example, white ink, and is a layer for preventing a color of a more inner portion of the colored layer L1 in the solid object Obj from being transmitted through the colored layer L1 and being thus visually recognized from the outside of the solid object Obj. In other words, the colored layer L1 and the shield layer L2 are provided so that a color to be displayed by the solid object Obj is accurately represented. Hereinafter, in the solid object Obj, the colored layer L1 and the shield layer L2, which are provided so that a color to be displayed by the solid object Obj is accurately represented, are referred to as an outer region LOUT of the solid object Obj in some cases.

The inner layer L3 is a layer which is provided to ensure the intensity of the solid object Obj, and is formed by using clear ink as a principle. Hereinafter, in the solid object Obj, the inner layer L3 and the hollow portion HL provided further inward than the outer region LOUT are referred to as an inner region LIN (or the "inside of the solid object Obj") of the solid object Obj in some cases.

In the present embodiment, for simplification, as illustrated in FIG. 12B, a case is assumed that the colored layer L1 has a substantially uniform thickness $\Delta L1$, the shield layer L2 has a substantially uniform thickness $\Delta L2$, and the inner layer L3 has a substantially uniform thickness $\Delta L3$, but a thickness of each layer may not be substantially uniform.

In the present specification, the expression such as "substantially uniform" or "substantially the same" includes not only a case of being completely uniform or the same but also a case of being regarded to be uniform or the same if various errors are ignored, such as manufacturing errors of the solid object shaping apparatus 1 or errors caused by noise superimposed on various signals.

FIG. 13 is a flowchart illustrating an example of an operation of the designation data generation portion 93 in a case of performing the shape complementing process.

As illustrated in FIG. 13, first, the designation data generation portion 93 sets a region with the thickness $\Delta L1$ which is directed from the outer surface SF of the model of the solid object Obj toward the inside of the model of the solid object Obj as the colored layer L1 in the model of the solid object Obj indicated by the model data Dat (S200). The designation data generation portion 93 sets a region with the thickness $\Delta L2$ which is directed from an inner surface of the colored layer L1 toward the inside of the model of the solid object Obj as the shield layer L2 (S210). The designation data generation portion 93 sets a region with the thickness $\Delta L3$ which is directed from an inner surface of the shield layer L2 toward the inside of the model of the solid object Obj as the inner layer L3 (S220). The designation data generation portion 93 sets a portion of the model of the solid object Obj located further inward than the inner layer L3 as the hollow portion HL (S230).

The designation data generation portion 93 performs the above-described shape complementing process so as to generate the section model data Ldat for shaping the solid object Obj having the colored layer L1, the shield layer L2, and the inner layer L3 as exemplified in FIG. 12B.

2.3 Designation Data Generation Process

In step S120, the designation data generation portion 93 performs the designation data generation process of determining arrangement of the block BL to be formed in each voxel Vx on the basis of the voxel data VD and the model data Dat and generating the designation data SD on the basis of the determination result and the voxel data VD. Hereinafter, with reference to FIGS. 14 to 17B, the designation data generation process will be described.

Figure 14:
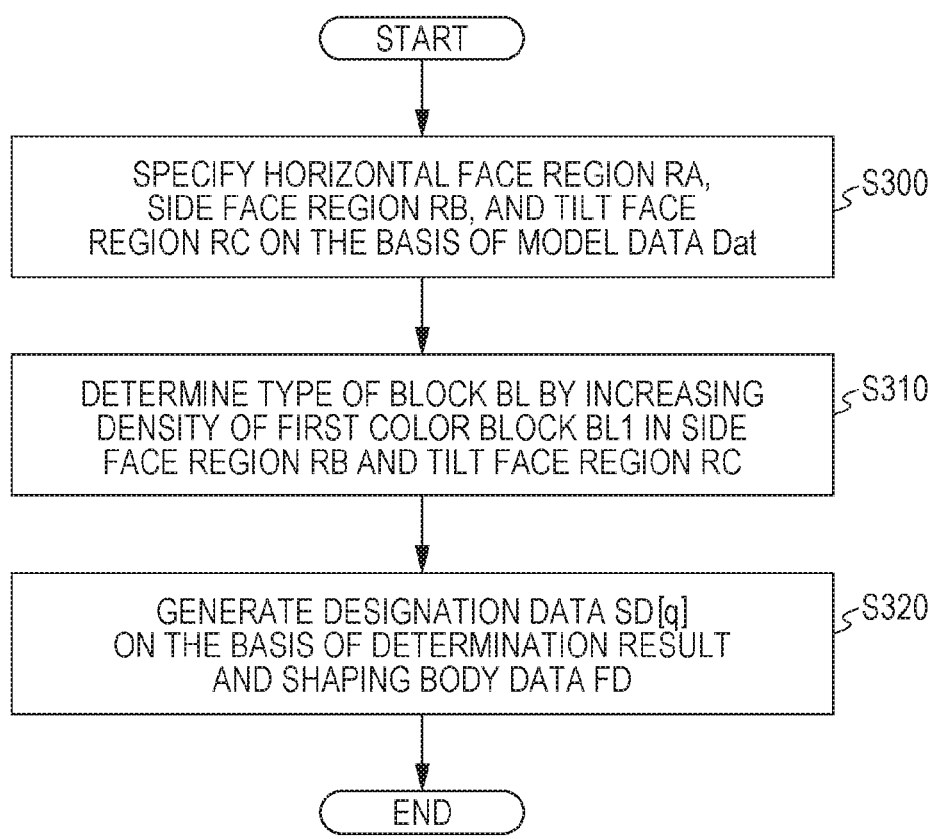
FIG. 14 is a flowchart illustrating a designation data generation process.

FIG. 14 is a flowchart illustrating an example of an operation of the designation data generation portion 93 in a case of performing the designation data generation process.

As illustrated in FIG. 14, the designation data generation portion 93 specifies a horizontal region RA (an example of a "first region"), a side face region RB (an example of a "second region"), and a tilt face region RC (an example of a "third region") from a voxel assembly on the basis of the model data Dat and the voxel data VD (S300).

Here, the horizontal region RA is a region formed of a predetermined number of horizontal face voxels Vx-A. The horizontal face voxel Vx-A is a voxel Vx in which, among six faces constituting a surface of the voxel Vx, either a face having a normal vector in the +Z direction (hereinafter, referred to as an "upper face") or a face having a normal vector in the −Z direction (hereinafter, referred to as a "lower face") corresponds to a surface of the voxel assembly. In other words, the horizontal face voxel Vx-A is a voxel Vx whose upper face or lower face is exposed as the surface of the voxel assembly.

The side face region RB is a region formed of a predetermined number of side face voxels Vx-B. The side face voxel Vx-B is a voxel Vx in which, among six faces constituting a surface of the voxel Vx, only one face of four faces (hereinafter, referred to as "side faces") excluding an upper face and a lower face corresponds to the surface of the voxel assembly. In other words, the side face voxel Vx-B is a voxel Vx whose single side face is exposed as the surface of the voxel assembly.

The tilt face region RC is a region formed of a predetermined number of tilt face voxels Vx-C. The tilt face voxel Vx-C is a voxel Vx in which, among six faces constituting a surface of the voxel Vx, an upper face or a lower face, and at least one side face are exposed as the surface of the voxel assembly.

Hereinafter, the horizontal face voxel Vx-A, the side face voxel Vx-B, and the tilt face voxel Vx-C are collectively referred to as a surface voxel Vx-S in some cases. In other words, the surface of the voxel assembly is formed of a plurality of surface voxels Vx-S.

In the present embodiment, the horizontal region RA is formed of a predetermined number of horizontal face voxels Vx-A, but the invention is not limited to such an aspect, and the horizontal region RA may be a region including a predetermined number or more of horizontal face voxels Vx-A. In this case, the horizontal region RA may be constituted of a plurality of surface voxels Vx-S, and a proportion of the horizontal face voxels Vx-A for the plurality of surface voxels Vx-S constituting the horizontal region RA may be equal to or higher than a first proportion (for example, 90%).

Similarly, the side face region RB may be constituted of a plurality of surface voxels Vx-S including a predetermined number or more of side face voxels Vx-B, and a proportion of the side face voxels Vx-B occupying the plurality of surface voxels Vx-S constituting the side face region RB may be equal to or higher than the first proportion.

Similarly, the tilt face region RC may be constituted of a plurality of surface voxels Vx-S including a predetermined number or more of tilt face voxels Vx-C, and a proportion of the tilt face voxels Vx-C occupying the plurality of surface voxels Vx-S constituting the tilt face region RC may be equal to or higher than a second proportion (for example, 30%). The first proportion is preferably higher than the second proportion.

Figure 15A:
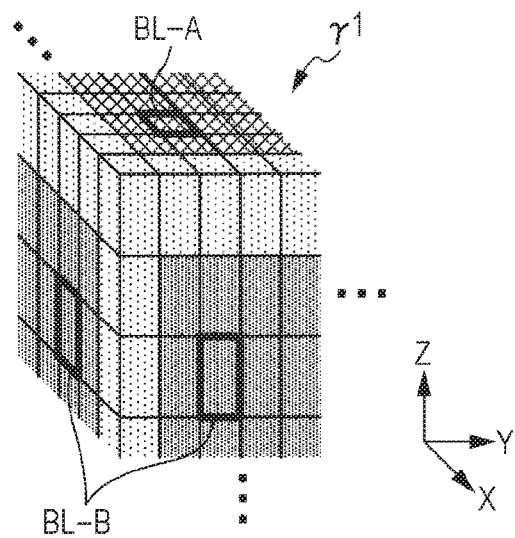
FIG. 15A is a diagram for explaining the type of block BL.
Figure 15B:
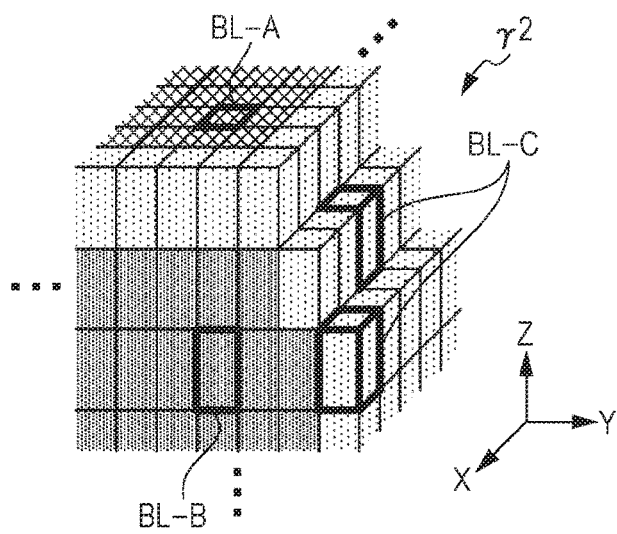
FIG. 15B is a diagram for explaining the type of block BL.
Figure 15C:
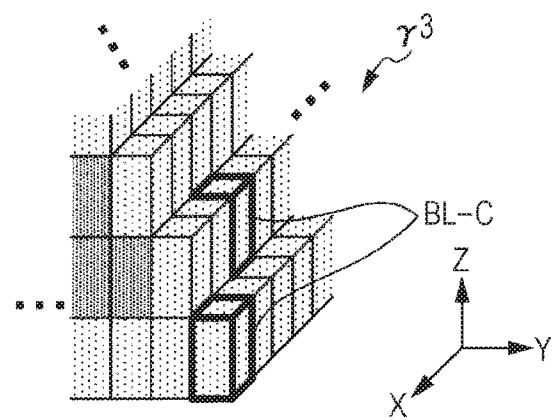
FIG. 15C is a diagram for explaining the type of block BL.

FIGS. 15A to 15C are diagrams for explaining a block BL formed in the surface voxel Vx-S. FIG. 15A is an enlarged view of the portion indicated by the reference sign y1 in FIG. 12A, FIG. 15B is an enlarged view of the portion indicated by the reference sign y2 in FIG. 12A, and FIG. 15C is an enlarged view of the portion indicated by the reference sign y3 in FIG. 12A.

As illustrated in FIGS. 15A and 15B, a horizontal face block BL-A (an example of a "first surface block") is provided in the horizontal face voxel Vx-A. As illustrated in the figures, the horizontal face block BL-A is a block BL whose upper face or lower face is exposed to a surface of a block assembly.

As illustrated in FIGS. 15A and 15B, a side face block BL-B (an example of a "second surface block") is provided in the side face voxel Vx-B. As illustrated in the figures, the side face block BL-B is a block BL whose one side face is exposed to the surface of the block assembly.

As illustrated in FIGS. 15B and 15C, a tilt face block BL-C (an example of a "third surface block") is provided in the tilt face voxel Vx-C. As illustrated in the figures, the tilt face block BL-C is a block BL whose upper face or lower face and one or more side faces are exposed to the surface of the block assembly.

Hereinafter, the horizontal face block BL-A, the side face block BL-B, and the tilt face block BL-C are collectively referred to as a surface block BL-S. In other words, the surface of the block assembly is formed of a plurality of surface blocks BL-S.

In step S300, the designation data generation portion 93 may specify the horizontal region RA, the side face region RB, and the tilt face region RC according to any methods.

For example, the designation data generation portion 93 may specify the horizontal region RA, the side face region RB, and the tilt face region RC on the basis of a normal vector of the outer surface SF of the model indicated by the model data Dat.

Specifically, in the voxel assembly, the designation data generation portion 93 may specify a region corresponding to a position on the outer surface SF at which the Z axis is substantially parallel to the normal vector of the outer surface SF of the model as the horizontal region RA; may specify a region corresponding to a position on the outer surface SF at which the Z axis is substantially perpendicular to the normal vector of the outer surface SF of the model as the side face region RB; and may specify regions other than the horizontal region RA or the side face region RB as the tilt face region RC. Here, the case where the normal vector is substantially parallel to the Z axis is a case where an angle formed between the normal vector and the X axis is equal to or less than a predetermined angle (for example, 5 degrees or less). The case where the normal vector is substantially perpendicular to the X axis is a case where an angle formed between the normal vector and the XY plane is equal to or less than a predetermined angle.

For example, the designation data generation portion 93 may specify the horizontal region RA, the side face region RB, and the tilt face region RC on the basis of the voxel data VD.

Specifically, first, the designation data generation portion 93 specifies a plurality of surface voxels Vx-S constituting a surface of a voxel assembly among voxels Vx constituting the voxel assembly indicated by the voxel data VD. Next, from the plurality of specified surface voxels Vx-S, the designation data generation portion 93 may specify a region including a set of a predetermined number or more of horizontal face voxels Vx-A as the horizontal region RA; may specify a region including a set of a predetermined number or more of side face voxels Vx-B as the side face region RB; and may specify a region including a set of a predetermined number or more of tilt face voxels Vx-C as the tilt face region RC.

As illustrated in FIG. 14, the designation data generation portion 93 according to the present embodiment determines the arrangement of a block BL so that a density of a first color block BL1 in the side face region RB and the tilt face region RC is higher than a density of the first color block BL1 in a case where the block BL is disposed on the basis of the voxel data VD (S310). The designation data generation portion 93 generates the designation data SD by changing arrangement of the block BL in the side face region RB and the tilt face region RC in the arrangement of the block BL indicated by the voxel data VD on the basis of a determination result in step S310 (S320).

The first color block BL1 is a block BL including a first color dot Dt1 (an example of a "first dot") which is formed by using chromatic ink corresponding to the first liquid. Hereinafter, a block BL including a second color dot Dt2 (an example of a "second dot") which is formed by using clear ink corresponding to the second liquid is referred to as a second color block BL2.

Figure 17A:
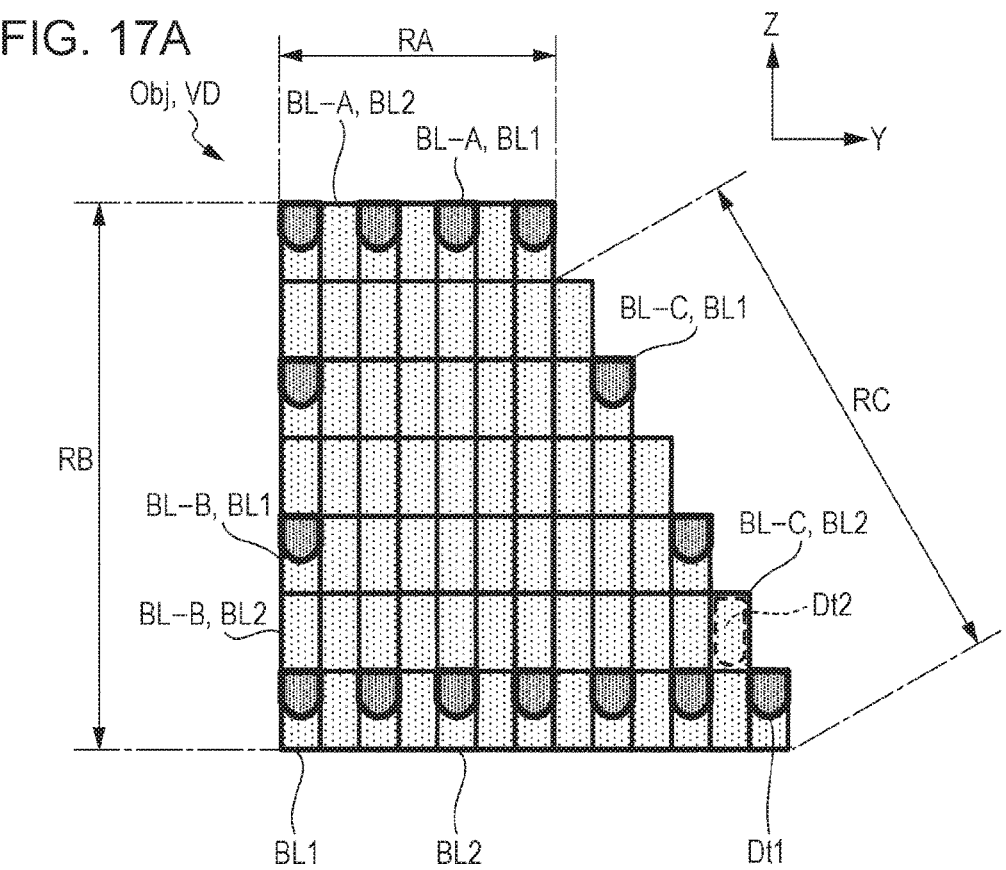
FIG. 17A is a diagram for explaining arrangement of blocks BL in the solid object Obj.
Figure 17B:
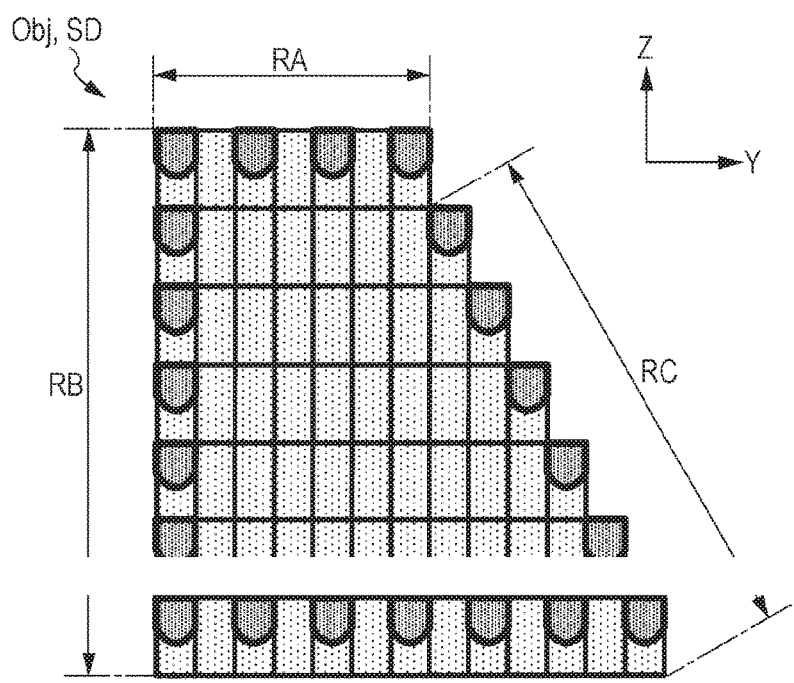
FIG. 17B is a diagram for explaining arrangement of blocks BL in the solid object Obj.

FIG. 16 is a diagram for explaining arrangement of voxels Vx in a voxel assembly indicated by the voxel data VD. FIGS. 17A and 17B are diagrams for explaining arrangement of blocks BL and dots in a solid object Obj. Of the figures, FIG. 17A illustrates arrangement of blocks BL and dots in a solid object Obj which is shaped on the basis of the voxel data VD, and FIG. 17B illustrates arrangement of blocks BL and dots in a solid object Obj which is shaped on the basis of the designation data SD.

FIGS. 16 to 17B illustrate sections obtained when cutting the solid object Obj illustrated in FIG. 12A on the YZ plane. In FIGS. 16 to 17B, for simplification of description, a case is assumed in which the colored layer L1 is a layer formed of blocks BL corresponding to one layer, and only the inner layer L3 is provided inside the colored layer L1, focusing on only a surface voxel Vx-S and a surface block BL-S. In FIGS. 16 to 17B, a case is assumed that a designated color for a model indicated by the model data Dat is a color which is reproduced when the first liquid as the chromatic ink and the second liquid as the clear ink are mixed with each other one to one.

As described above, the voxel assembly indicated by the voxel data VD is obtained by discretizing a shape and a color of the model indicated by the model data Dat in a lattice form. A single color is given to each voxel Vx in the voxel data VD. For example, a voxel Vx given the first color is uniformly colored in the first color in the entire voxel Vx, and thus a color which is different from the first color is not given to a part of the voxel Vx.

Therefore, as in the example illustrated in FIG. 16, in a case where a designated color for a model indicated by the model data Dat is a color which can be reproduced when the first liquid and the second liquid are mixed with each other one to one, a plurality of surface voxels Vx-S constituting the surface of the voxel assembly are provided so that the number of first color voxels Vx1 as a virtual rectangular parallelepiped having the first color is the same as the number of second color voxels Vx2 as a virtual rectangular parallelepiped having the second color in each of the horizontal region RA, the side face region RB, and the tilt face region RC. Therefore, an area of a portion formed by using the first liquid having the first color can be made the same as an area of a portion formed by using the second liquid having the second color in each of the horizontal region RA, the side face region RB, and the tilt face region RC, and thus it is possible to generate the voxel assembly which accurately reproduces the designated color.

However, a voxel Vx is a theoretical virtual rectangular parallelepiped, but a dot is formed by ink ejected from the ejecting portion D. Thus, a shape of the dot may not be a rectangular parallelepiped shape. A degree of penetration (spread) into the powder layer PW may differ depending on the type of ink. In other words, generally, a shape of the dot is different from a shape of the voxel Vx.

For example, as in the present embodiment, in a case where a large dot is provided by ejecting ink from the ejecting portion D twice, a shape of the large dot has a high possibility of being vertically long in the Z axis direction. For this reason, in the present embodiment, a shape of the voxel Vx is also preferably vertically long. As in the present embodiment, in a case where a shape of the voxel Vx is vertically long, a colorant component cannot penetrate thereinto by a thickness $\Delta Z$ of the voxel Vx depending on the type of ink. For example, as exemplified in FIG. 17A, there is a case where the second color block BL2 formed by using the clear ink can penetrate by the thickness $\Delta Z$ of the voxel Vx, but the first color block BL1 formed by using the chromatic ink can penetrate by only a half of the thickness $\Delta Z$ of the voxel Vx.

For this reason, in the example illustrated in FIG. 17A, even if a plurality of surface blocks BL-S constituting a surface of a block assembly are provided so that the number of first color blocks BL1 is the same as the number of second color block BL2 in each of the horizontal region RA, the side face region RB, and the tilt face region RC, an area of the first color dot Dt1 is not the same as an area of the second color dot Dt2 in each of the horizontal region RA, the side face region RB, and the tilt face region RC, and thus the generated block assembly cannot accurately reproduce the designated color.

In other words, in the example illustrated in FIG. 17A, the first color dot Dt1 occupies 50% of the area in the horizontal region RA, but the first color dot Dt1 occupies only 25% of the area in the side face region RB and the tilt face region RC. As a result, shades of the first color occur between the side face region RB or the tilt face region RC and the horizontal region RA.

Therefore, in the present embodiment, as illustrated in FIG. 17B, a plurality of surface blocks BL-S constituting the surface of the block assembly are provided so that the number of first color blocks BL1 per predetermined number is larger than the number of second color block BL2 per predetermined number in the side face region RB and the tilt face region RC. In other words, a plurality of surface blocks BL-S constituting the surface of the block assembly are provided so that the number of first color blocks BL1 in the side face region RB and the number of first color blocks BL1 in the tilt face region RC are different from the number of first color blocks BL1 in the horizontal region RA. More specifically, the number of first color blocks BL1 is adjusted so that a proportion (50% in this example) of an area occupied by the first color dots Dt1 in the side face region RB and the tilt face region RC is the same as in the horizontal region RA. Consequently, it is possible to prevent shades of the first color from occurring between the horizontal region RA, the side face region RB, and the tilt face region RC.

In the example illustrated in FIG. 17B, a case is assumed in which a uniform color is displayed in the horizontal region RA, the side face region RB, and the tilt face region RC, but in a case where different colors are displayed in the horizontal region RA, the side face region RB, and the tilt face region RC, the number of first color blocks BL1 may be adjusted so that a proportion of an area occupied by the first color dots Dt1 becomes a proportion corresponding to a color of a model indicated by the model data Dat.

In this case, information in which a color of a model indicated by the model data Dat is correlated with the number of first color blocks BL1 per predetermined number of blocks BL for each of the horizontal region RA, the side face region RB, and the tilt face region RC, may be stored in the storage portion 60. Alternatively, information in which an angle formed between the normal vector of the outer surface SF and the Z axis, a color of a model indicated by the model data Dat, the number of first color blocks BL1 per predetermined number of blocks BL are correlated with each other, may be stored in the storage portion 60.

In this case, arrangement of blocks BL may be determined so that a proportion of an area occupied by the first color dots Dt1 becomes a proportion corresponding to a color of a model indicated by the model data Dat on the basis of the information stored in the storage portion 60, and the designation data SD may be generated on the basis of the determination result.

3. Conclusion of Embodiment

As described above, in the present embodiment, by taking into consideration a shape difference between a voxel Vx and a dot, and positions of voxels Vx in which the dots are formed, such as the horizontal region RA, the side face region RB, and the tilt face region RC, arrangement of blocks BL is determined so that the first color block BL1 has a density appropriate for reproducing a designated color for a model indicated by the model data Dat. For this reason, it is possible to shape a solid object Obj which minimizes color unevenness or deterioration in color reproducibility and accurately reproduces a color to be originally displayed (designated color).

B. Modification Examples

The above-described embodiment may be variously modified. Specific modification aspects will be exemplified below. Two or more aspects which are arbitrarily selected from the following examples may be combined with each other as appropriate within the scope which does not cause contradiction to each other.

In modification examples described below, elements whose operations or functions are equivalent to those in the embodiment are given the same reference numerals in the above description, and a detailed description thereof will be omitted as appropriate.

Modification Example 1

In the above-described embodiment, in the process in step S310, as illustrated in FIGS. 17A and 17B, the designation data generation portion 93 determines the arrangement of blocks BL so that a density of the first color blocks BL1 in the side face region RB and the tilt face region RC is higher than in a case where the blocks BL are disposed on the basis of the voxel data VD, but the invention is not limited to such an aspect.

Figure 18A:
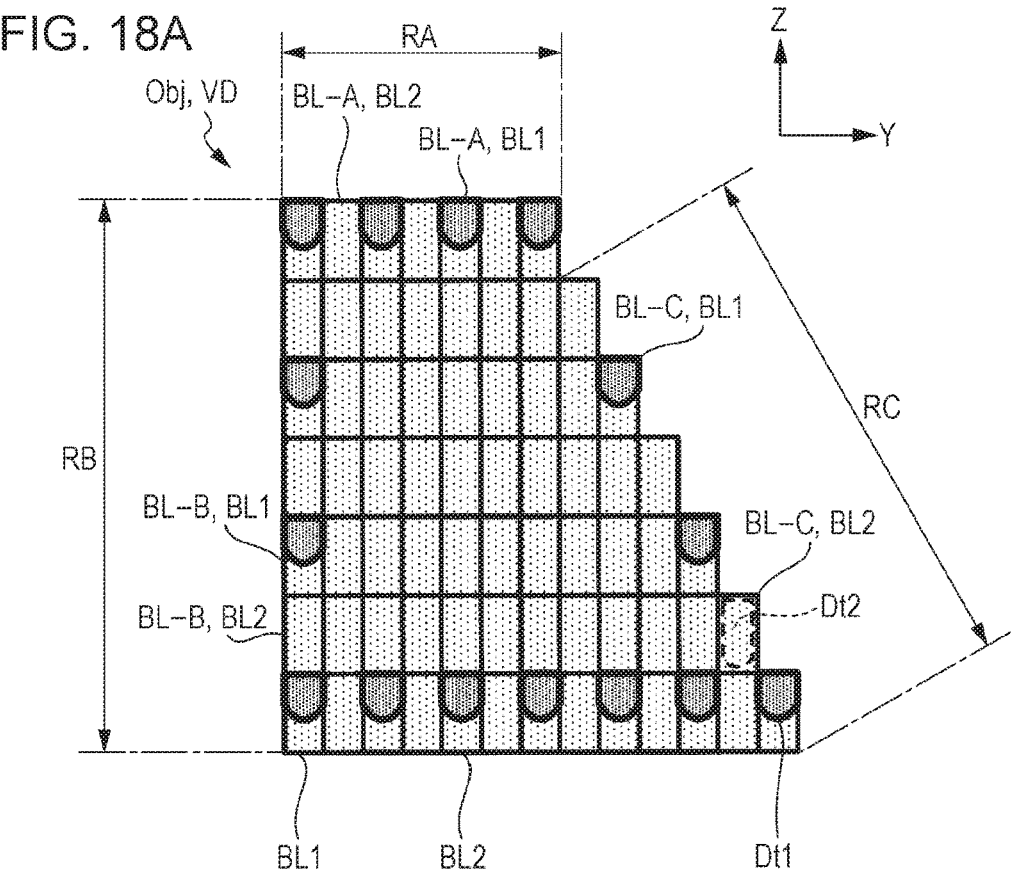
FIG. 18A is a diagram for explaining arrangement of blocks BL in a solid object Obj according to Modification Example 1.
Figure 18B:
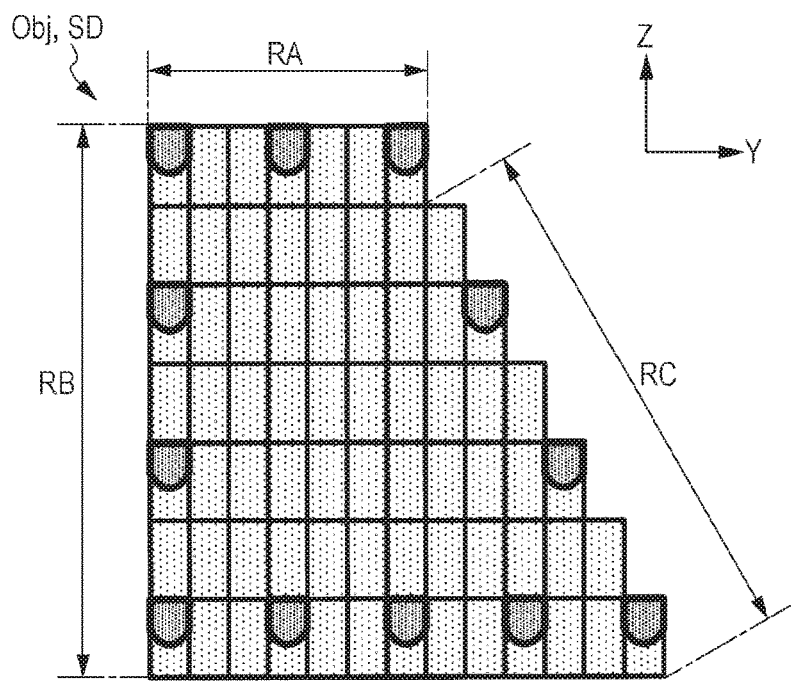
FIG. 18B is a diagram for explaining arrangement of blocks BL in a solid object Obj according to Modification Example 1.

For example, in the process in step S310, as illustrated in FIGS. 18A and 18B, the designation data generation portion 93 may generate the designation data SD by determining arrangement of blocks BL (refer to FIG. 18B) so that a density of the first color blocks BL1 in horizontal region RA is lower than in a case (refer to FIG. 18A) where the blocks BL are disposed on the basis of the voxel data VD.

The designation data generation portion 93 may generate the designation data SD by determining arrangement of blocks BL so that a density of the first color blocks BL1 in the side face region RB and the tilt face region RC is higher than in a case where the blocks BL are disposed on the basis of the voxel data VD, and a density of first color blocks BL1 in horizontal region RA is lower than in a case where the blocks BL are disposed on the basis of the voxel data VD.

In summary, a density of the first color blocks BL1 may be adjusted so that a proportion of an area occupied by the first color dots Dt1 becomes a proportion corresponding to a color of a model indicated by the model data Dat in each of the horizontal region RA, the side face region RB, and the tilt face region RC.

Modification Example 2

In the above-described embodiment and modification example, a voxel Vx has a vertically long shape in the Z axis direction, but the invention is not limited to such an aspect, and the voxel Vx may have any rectangular parallelepiped shape. For example, as illustrated in FIGS. 19A and 19B, a horizontally long voxel Vx may be employed in which sides of the voxel Vx in the X axis direction and the Y axis direction are longer than a side in the Z axis direction.

Also in a case where a horizontally long voxel Vx is employed as in the present modification example, if shapes of a voxel Vx and a dot are different from each other, a density of the first color blocks BL1 may be adjusted so that a proportion of an area occupied by the first color dots Dt1 becomes a proportion corresponding to a color of a model indicated by the model data Dat. For example, in the examples illustrated in FIGS. 19A and 19B, in the process in step S310, the designation data generation portion 93 may generate the designation data SD by determining arrangement of blocks BL (refer to FIG. 19B) so that a density of the first color blocks BL1 in horizontal region RA and the tilt face region RC is higher than in a case (refer to FIG. 19A) where the blocks BL are disposed on the basis of the voxel data VD.

Modification Example 3

In the above-described embodiment and modification examples, the solid object shaping apparatus 1 performs the shaping process according to the second shaping method in which ink is ejected onto a powder layer PW, and a dot is formed by curing the ink along with powders, but the invention is not limited to such an aspect, and the shaping process may be performed according to the first shaping method in which a dot is formed by curing only ink without using a powder layer PW.

Also in this case, if shapes of a voxel Vx and a dot are different from each other, such as a case where two small dots are formed in a single voxel Vx, a density of the first color blocks BL1 may be adjusted so that a proportion of an area occupied by the first color dots Dt1 becomes a proportion corresponding to a color of a model indicated by the model data Dat.

Figure 20A:
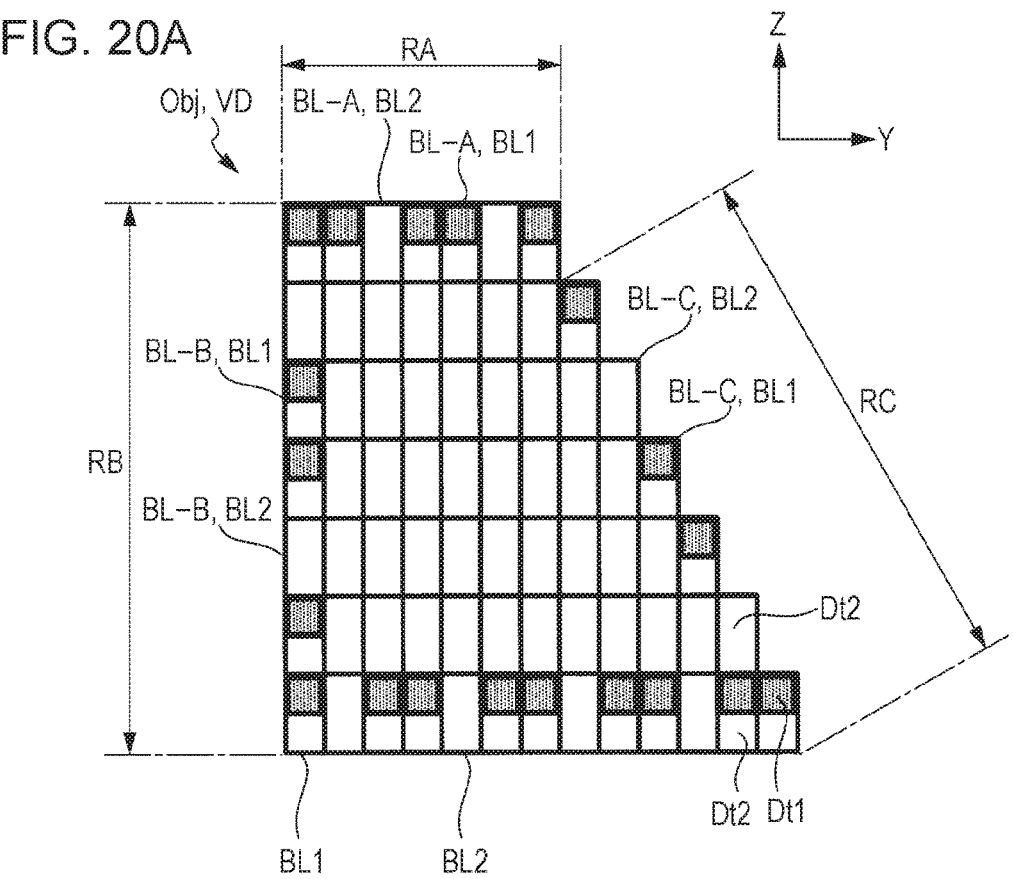
FIG. 20A is a diagram for explaining arrangement of blocks BL in a solid object Obj according to Modification Example 3.
Figure 20B:
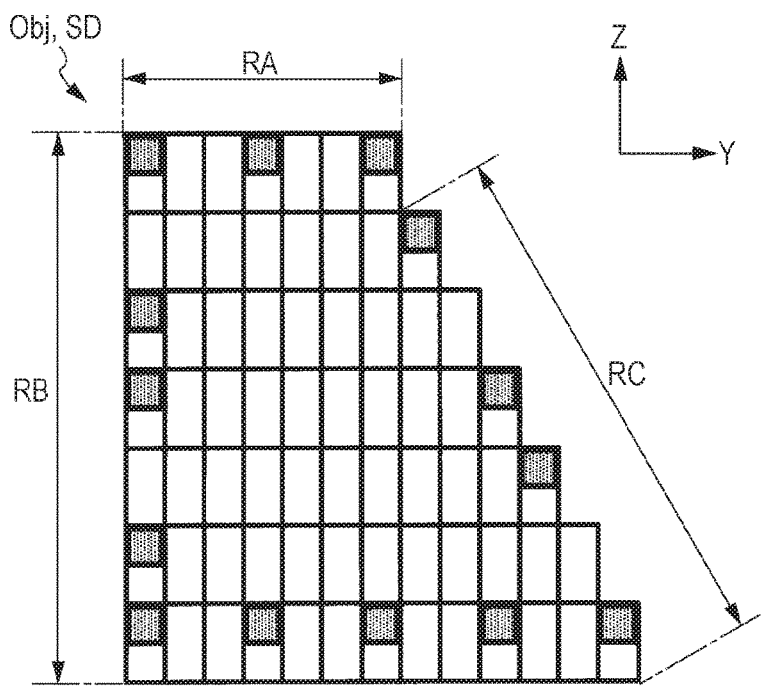
FIG. 20B is a diagram for explaining arrangement of blocks BL in a solid object Obj according to Modification Example 3.

In FIGS. 20A and 20B, a case is assumed in which the first color block BL1 is formed of the first color dot Dt1 as a small dot formed by using the first liquid and the second color dot Dt2 as a small dot formed by using the second liquid, and the second color block BL2 is formed of the second color dot Dt2 as a large dot formed by using the second liquid. In cases of the figures, in the process in step S310, the designation data generation portion 93 may generate the designation data SD by determining arrangement of blocks BL (refer to FIG. 20B) so that a density of the first color blocks BL1, for example, in horizontal region RA is lower than in a case (refer to FIG. 20A) where the blocks BL are disposed on the basis of the voxel data VD.

Modification Example 4

In the above-described embodiment and modification examples, as exemplified in FIG. 12B, the solid object Obj shaped by the solid object shaping apparatus 1 includes the outer region LOUT having the colored layer L1 and the shield layer L2, and the inner region LIN having the inner layer L3 and the hollow portion HL, but the invention is not limited to such an aspect, and the solid object shaping apparatus 1 may shape a solid object Obj having at least the colored layer L1.

In the solid object Obj, a clear layer which is formed by using clear ink and has a predetermined thickness may be provided outside the colored layer L1 so as to cover the colored layer L1.

Modification Example 5

In the above-described embodiment and modification examples, ink which can be ejected by the solid object shaping apparatus 1 is a total of six types of ink including five types of shaping ink and a single type of support ink, but the invention is not limited to such an aspect. For example, the solid object shaping apparatus 1 may eject at least first color ink (first liquid) and second color ink (second liquid). In this case, the first color ink (first liquid) may be chromatic ink or achromatic ink. In addition, in this case, the second color ink (second liquid) may have a color which is different from a color of the first liquid, and may be any one of chromatic ink, achromatic ink such as white ink, and clear ink.

In a case where both of the first liquid and the second liquid are chromatic ink, a density of the first color blocks BL1 may be adjusted so that a proportion of an area occupied by the first color dots Dt1 becomes a proportion corresponding to a color of a model indicated by the model data Dat, and a density of the second color blocks BL2 may also be adjusted so that a proportion of an area occupied by the second color dots Dt2 becomes a proportion corresponding to a color of a model indicated by the model data Dat.

The colorant component of the first liquid corresponds to a "first colorant component". In a case where the second liquid has a colorant component, the colorant component of the second liquid corresponds to a "second colorant component".

Modification Example 6

In the above-described embodiment and modification examples, the process of specifying a horizontal region RA in step S300, the process of determining arrangement of a block BL in step S310, and the process of generating the designation data SD in step S320 are performed by the designation data generation portion 93 provided in the host computer 9, but the invention is not limited to such an aspect, and the processes may be performed by the control portion 6. In a case where the processes in steps S300 to S320 are performed by the control portion 6, the designation data SD generated by the designation data generation portion 93 may designate formation of a dot with the same content as the content indicated by the voxel data VD.

Modification Example 7

In the above-described embodiment and modification examples, ink ejected from the ejecting portion D is curable ink such as ultraviolet curable ink, but the invention is not limited to such an aspect, and the ink may be ink made of a thermoplastic resin or the like.

In this case, the ink is preferably ejected in a state of being heated in the ejecting portion D.

For example, the ejecting portion D according to the present modification example may perform so-called thermal type ink ejection in which a heat source (not illustrated) provided in the cavity 320 generates heat so as to generate foams in the cavity 320, and thus ink is ejected due to an increase in pressure inside the cavity 320.

In this case, the ink ejected from the ejecting portion D is cooled by ambient air and is thus cured. Therefore, the solid object shaping apparatus 1 may not include the curing unit 61.

Modification Example 8

In the above-described embodiment and modification examples, sizes of dots which can be formed by the solid object shaping apparatus 1 are two kinds of sizes such as a small dot and a large dot, but the invention is not limited to such an aspect, and sizes of dots which can be formed by the solid object shaping apparatus 1 may be one or more kinds of sizes.

For example, the head unit 3 may eject three types of dots with different sizes, such as a small dot filling ⅓ of a size of a voxel Vx, a medium dot filling ⅔ of the size of the voxel Vx, and a large dot filling the entire voxel Vx.

Modification Example 9

In the above-described embodiment and modification examples, the designation data generation portion 93 is provided in the host computer 9, but the invention is not limited to such an aspect, and the designation data generation portion 93 may be provided in the solid object shaping apparatus 1. For example, the designation data generation portion 93 may be installed as a functional block which is realized when the control portion 6 operates according to a control program. In other words, the designation data generation portion 93 may be provided in the control portion 6.

In a case where the solid object shaping apparatus 1 includes the designation data generation portion 93, the solid object shaping apparatus 1 may generate the designation data SD on the basis of the model data Dat which is supplied from an external device of the solid object shaping apparatus 1, and may shape a solid object Obj on the basis of the waveform designation signal SI which is generated by using the generated designation data SD.

Modification Example 10

In the above-described embodiment and modification examples, the solid object shaping system 100 includes the model data generation portion 92, but the invention is not limited to such an aspect, and the solid object shaping system 100 may not include the model data generation portion 92. In other words, the solid object shaping system 100 may shape a solid object Obj on the basis of the model data Dat supplied from an external device of the solid object shaping system 100.

Modification Example 11

In the above-described embodiment and modification examples, the driving waveform signal Com is a signal having the waveforms PL1 and PL2, but the invention is not limited to such an aspect. For example, the driving waveform signal Com may be any signal as long as the signal has a waveform which can cause ink in an amount corresponding to a dot having at least one kind of size to be ejected from the ejecting portion D. For example, the driving waveform signal Com may have waveforms depending on the type of ink.

In the above-described embodiment and modification examples, the number of bits of the waveform designation signal SI[m] is 2 bits, but the invention is not limited to such an aspect. The number of bits of the waveform designation signal SI[m] may be defined as appropriate depending on the number of kinds of sizes of dots formed by ink ejected from the ejecting portion D.

The entire disclosure of Japanese Patent Application No: 2015-030154, filed Feb. 19, 2015 is expressly incorporated by reference herein.

The invention claimed is:

1. A solid object shaping apparatus comprising:
a head unit that can eject a plurality of types of liquids including a first liquid containing a first colorant component used to represent a designated color which is designated by a model for representing a shape and a color of a solid object, and a second liquid having a color which is different from the first liquid; and
a curing unit that cures the first liquid ejected from the head unit so as to form a first dot, and cures the second liquid ejected from the head unit so as to form a second dot,
wherein a first color block is formed by using the first dot, a second color block is formed by using the second dot without using the first dot, and the solid object is shaped by using a plurality of blocks including the first color block and the second color block,
wherein a plurality of blocks constituting the solid object include a first surface block whose upper face or lower face corresponds to a surface of the solid object when the solid object is shaped, and a second surface block whose one side face corresponds to the surface of the solid object when the solid object is shaped, and
wherein the number of the first color blocks forming a first region in a case where the model designates the designated color for the first region formed of a predetermined number of the first surface blocks is different from the number of the first color blocks forming a second region in a case where the model designates the designated color for the second region formed of a predetermined number of the second surface blocks.

2. The solid object shaping apparatus according to claim 1,
wherein the plurality of blocks constituting the solid object further include a third surface block whose upper face or lower face and at least one of side faces correspond to the surface of the solid object, and
wherein the number of the first color blocks forming a third region in a case where the model designates the designated color for the third region formed of a predetermined number of the third surface blocks is different from the number of the first color blocks forming a first region in a case where the model designates the designated color for the first region.

3. The solid object shaping apparatus according to claim 1,
wherein a proportion of an area occupied by one or a plurality of first dots included in the first region for the first region in a case where the model designates the designated color to a total area of the first region is substantially the same as a proportion of an area occupied by one or a plurality of first dots included in the second region to a total area of the second region in a case where the model designates the designated color for the second region.

4. The solid object shaping apparatus according to claim 2,
wherein a proportion of an area occupied by one or a plurality of first dots included in the first region for the first region in a case where the model designates the designated color to a total area of the first region is substantially the same as a proportion of an area occupied by one or a plurality of first dots included in the third region to a total area of the third region in a case where the model designates the designated color for the third region.

5. The solid object shaping apparatus according to claim 1,
wherein an amount of colorant components contained in the second liquid is smaller than an amount of colorant components contained the first liquid.

6. The solid object shaping apparatus according to claim 1,
wherein the second liquid contains a second colorant component used to represent the designated color.

7. A control method for a solid object shaping apparatus which includes a head unit that can eject a plurality of types of liquids including a first liquid containing a first colorant component used to represent a designated color which is designated by a model for representing a shape and a color of a solid object, and a second liquid having a color which is different from the first liquid; and a curing unit that cures the first liquid ejected from the head unit so as to form a first dot, and cures the second liquid ejected from the head unit so as to form a second dot, and which forms a first color block by using the first dot, forms a second color block by using the second dot without using the first dot, and shapes the solid object by using a plurality of blocks including the first color block and the second color block, the method comprising:
controlling the head unit and the curing unit in order to shape the solid object,
wherein a plurality of blocks constituting the solid object include a first surface block whose upper face or lower face corresponds to a surface of the solid object when the solid object is shaped, and a second surface block whose one side face corresponds to the surface of the solid object when the solid object is shaped, and
wherein the number of the first color blocks forming a first region in a case where the model designates the designated color for the first region formed of a predetermined number of the first surface blocks is different from the number of the first color blocks forming a second region in a case where the model designates the designated color for the second region formed of a predetermined number of the second surface blocks.

8. A control program for a solid object shaping apparatus which includes a head unit that can eject a first liquid containing a first colorant component used to represent a designated color which is designated by a model for representing a shape and a color of a solid object, and a second liquid having a color which is different from the first liquid; a curing unit that cures the first liquid ejected from the head unit so as to form a first dot, and cures the second liquid ejected from the head unit so as to form a second dot; and a computer, and which forms a first color block by using the first dot, forms a second color block by using the second dot without using the first dot, and shapes the solid object by using a plurality of blocks including the first color block and the second color block, the program causing the computer to function as:
a control portion that controls the head unit and the curing unit in order to shape the solid object,
wherein a plurality of blocks constituting the solid object include a first surface block whose upper face or lower face corresponds to a surface of the solid object when the solid object is shaped, and a second surface block whose one side face corresponds to the surface of the solid object when the solid object is shaped, and
wherein the number of the first color blocks forming a first region in a case where the model designates the designated color for the first region formed of a predetermined number of the first surface blocks is different from the number of the first color blocks forming a second region in a case where the model designates the designated color for the second region formed of a predetermined number of the second surface blocks.

* * * * *